United States Patent [19]
Grinberg et al.

[11] Patent Number: 5,680,231
[45] Date of Patent: Oct. 21, 1997

[54] HOLOGRAPHIC LENSES WITH WIDE ANGULAR AND SPECTRAL BANDWIDTHS FOR USE IN A COLOR DISPLAY DEVICE

[75] Inventors: Jan Grinberg; Anson Au; Chiung-Sheng Wu, all of Los Angeles, Calif.

[73] Assignee: Hughes Aircraft Company, Los Angeles, Calif.

[21] Appl. No.: 465,848

[22] Filed: Jun. 6, 1995

[51] Int. Cl.$^6$ ............................ G02B 5/32; G03H 1/26; G02F 1/1335
[52] U.S. Cl. ........................... 359/15; 359/19; 359/22; 349/105
[58] Field of Search ........................ 359/10, 15, 19, 359/20, 22; 349/105, 15; 348/40, 41

[56] References Cited

U.S. PATENT DOCUMENTS

| | | | |
|---|---|---|---|
| 4,728,174 | 3/1988 | Grinberg et al. | 350/334 |
| 4,807,978 | 2/1989 | Grinberg et al. | 350/3.73 |
| 5,506,701 | 4/1996 | Ichikawa | 359/15 |
| 5,526,145 | 6/1996 | Weber | 359/15 |

OTHER PUBLICATIONS

"HDP-6000B Liquid Crystal Projector", Hughes Aircraft Company, Ground Systems Group Product Brochure, Jun. 1988.

*Primary Examiner*—Paul M. Dzierzynski
*Assistant Examiner*—Audrey Chang
*Attorney, Agent, or Firm*—V. D. Duraiswamy; W. K. Denson-Low

[57] ABSTRACT

The angular and/or spectral bandwidth of a holographic lens assembly can be widened to accomodate highly diverging and/or wide spectral bandwidth illumination sources, respectively. Each lens in the lens assembly is comprised of a plurality of angularly customized holograms (an angularly customized hologram set). Each of the individual holograms in an angularly customized hologram set has an acceptance angle range that is centered on a discrete peak acceptance angle. The separation between the holograms' peak acceptance angles is chosen so that the acceptance angle ranges of the individual holograms overlap. The resulting cumulative acceptance angle range of each angularly customized hologram set provides a holographic lens assembly that has a wider angular bandwidth than prior holographic lenses. The spectral bandwidth of the lens assembly can be similarly widened by adding a spectrally customized hologram set to the lens assembly in which the spectral waveband of each of the individual spectrally customized holograms partially overlap. Specific applications to various types of displays are disclosed, as well as preferred fabrication techniques for the holographic lenses.

48 Claims, 12 Drawing Sheets

HOLOGRAPHIC LENSES WITH WIDE ANGULAR AND SPECTRAL BANDWIDTHS FOR USE IN A COLOR DISPLAY DEVICE

BACKGROUND OF THE INVENTION

1. Field of the Invention

This invention relates to display devices, and more specifically to color display devices in which input white light is separated into its component colors for use in the display device.

2. Description of the Related Art

A conventional method for achieving full color performance in a color display such as a backlit, transmissive flat-panel matrix display employs a repeated series of red, green and blue transmissive filter stripes to color code incident white light. The white light passes through the absorptive dye filter stripes, which transmit the filter color but absorb other colors. The matrix display likewise consists of a repeated series of red, green and blue information containing lines or pixels. The filter stripes are precisely registered with respect to the matrix display so that the red, green and blue light emerging from the filters pass through the red, green and blue information containing stripes or pixels of the matrix display, respectively. A typical display may have 525 color lines, which are visually integrated by the viewer to produce a full color image.

One of the principal drawbacks of this approach is that each filter stripe absorbs light outside of its pass band. Thus, most of the light which is directed onto the display device will generally be absorbed and never displayed, resulting in a reduced output intensity and/or the need for light enhancement apparatus. Furthermore, the observer's eye has to integrate the intensities of the three color display stripes to perceive the desired color hue. This limits the resolution of the display. The complicated lithographic process associated with deposition of the color stripes adds additional complexity to the process.

It is also possible to provide a full color display from a monochromatic CRT by means of one or more color light valves which respond to the CRT output. In one approach three CRTs are employed with three separate light valves and associated optics to produce an integrated full color display. The system requires a large amount of equipment and coordination, and is expensive and complicated. Another approach uses three one-inch CRTs to address a two-inch light valve with optics that combine the three primary color images on the screen. Still another approach involves a sequential addressing of a CRT/light valve combination by the red, green and blue fields, and synchronous rotation of a color wheel in front of a light valve. To accomplish this, a very fast CRT/light valve combination is needed in addition to a three field memory. More than two-thirds of the light is lost in the system and fails to appear on the output display.

A color display system that addresses these problems is disclosed in U.S. Pat. No. 4,807,978, entitled "COLOR DISPLAY DEVICE AND METHOD USING HOLOGRAPHIC LENSES", issued Feb. 28, 1989 to Jan Grinberg and Ronald T. Smith and assigned to Hughes Aircraft Company, the assignee of the present invention. In this system, a full color display is achieved using a holographic lens assembly. The holographic lens assembly is composed of discrete holograms which are sensitive to different wavelength bands of light. Each hologram focuses (via diffraction) input light within its waveband onto a corresponding target area, and generally transmits input light outside of its waveband. A separate target area is provided for each hologram so that incoming light is divided into its constituent colors. The separate color stripes may then be operated upon to produce a desired display. By generally transmitting rather than absorbing light outside the band of each hologram, the lens assembly achieves a high degree of both efficiency and resolution compared to other prior display systems. In addition, the holographic lens assembly allows one to avoid the complicated lithographic process used to deposit the color stripes used in some of the other prior art approaches.

However, this system has a limitation that arises out of the inherent physical properties of holograms in general. Any given hologram has a certain wavelength range and acceptance angle range (referred to as the spectral and angular bandwidths, respectively) over which it will diffract light. A crucial parameter for a display system that utilizes a holographic lens assembly is the efficiency of the hologram over its wavelength and acceptance angle range.

With respect to angular bandwidth, holograms generally exhibit a peak diffraction efficiency at a peak acceptance angle, with a progressively diminishing diffraction efficiency as the acceptance angle moves away from the peak angle. For projection-view systems in which the image is projected onto a screen, the angular bandwidth limitation of the holograms is not as critical to the operation of the display system because the illumination source can be chosen so that the divergence and incidence angles of the illumination light falls within the angular bandwidth of the holograms being used. However, for direct-view systems, in which room light or other highly diverging light sources are used as the readout illumination source, the relatively narrow angular bandwidth of the holograms will result in inadequate color purity. This is because a portion of the light that is incident on the holograms at angles away from their peak diffraction angles will pass through the holographic lens assembly undiffracted. This undiffracted light will strike random target areas and will frustrate the color separation (also referred to as the color purity) of the device.

The spectral bandwidth curve for any given hologram is similar to its angular bandwidth curve. That is, the hologram exhibits a peak diffraction efficiency at a central readout beam wavelength with a progressively diminishing diffraction efficiency as the readout beam wavelength moves away from the central wavelength. For display systems in which narrow band readout sources can be chosen to match the spectral bandwidth of the holograms (such as projection-view systems) the spectral bandwidth limitation is not as critical. For example, red, green and blue lasers could be used as the readout illumination sources. However, for display systems which utilize white light or other diverging light source as the illumination source (such as direct-view display systems), the narrow spectral bandwidth of the individual holograms will also result in inadequate color purity.

SUMMARY OF THE INVENTION

In view of the problems associated with the approaches discussed above, the present invention provides a novel holographic lens assembly for use in color display devices. The angular and/or spectral bandwidth of the holographic lens assembly can be widened to accomodate highly diverging and/or wide spectral bandwidth illumination sources, respectively.

The present lens assembly may also be used in the output end of a display device that operates in transmission mode to achieve a predetermined viewing angle. In addition to providing control over the viewing angle, the output lens assembly superimposes the different color stripes on each other, eliminating the need for the viewer to visually integrate the intensities of separate color stripes. This significantly improves the display's resolution. In addition, the holographic lenses may be designed so that they reject illumination light with an angle of incidence or divergence that exceeds the angular bandwidth of the lens and/or with a wavelength that falls outside the spectral bandwidth of the lens.

The present invention may be utilized in a color display device which has a target array comprising a plurality of generally adjacent target areas which correspond to predetermined waveband components, preferably red, green and blue bands, of an input light beam. An area holographic lens assembly is spaced from the target array and adapted to receive an input light beam. The lens assembly has, for each target area in the target array, a lens comprised of a plurality of angularly customized holograms (an angularly customized hologram set) which are optically aligned with the target area. Each lens at least partially focuses light within the waveband of its corresponding target area onto that area, and generally transmits light outside of its waveband. The various lenses are arranged in the lens assembly so that at least one lens for each of the waveband components is located in the input light beam path at substantially all locations in the beam.

Each of the individual holograms in the angularly customized hologram set that make up a lens has an acceptance angle range that is centered on a discrete peak acceptance angle. The separation between the holograms' peak acceptance angles is chosen so that the acceptance angle ranges of the individual holograms partially overlap. The resulting cumulative acceptance angle range of each angularly customized hologram set provides a holographic lens assembly that has a wider angular bandwidth than prior holographic lenses. The spectral bandwidth of the lens assembly can be similarly widened by adding a spectrally customized hologram set to the lens assembly in which the spectral waveband of each of the spectrally customized holograms partially overlap. Illumination light whose angle of incidence exceeds a predetermined range and/or whose wavelength falls outside a predetermined waveband can be rejected rather than transmitted through the lens assembly by adding one or more reflection holograms to the angularly customized and/or the spectrally customized hologram set, respectively.

In a preferred embodiment lenses tuned respectively to red, green and blue wavebands are used in the lens assembly. Lenses of the same color are laterally positioned with respect to each other, while the different color lenses overlap and are laterally offset from each other by about one-third the lens width. Light within any of the color bands will encounter a lens for each different color band, and will be generally transmitted by the other two color lenses but focused onto a particular target area by its own color lens. The incoming light is thus broken down into its component wavebands, with substantially all of the light directed onto one or another of the target areas. In principle, substantially 100% light efficiency can be achieved over a wider acceptance and divergence angle range than prior holographic lens based display systems.

Processing of the holographic lenses is less complicated than the lithographic process formerly used to deposit color stripes. Various constructions are possible, including the formation of red, green and blue lenses on a single substrate, the formation of the three color lenses on individual substrates which are then laminated together, or the formation of the red lens on one substrate and the blue and green lenses on a second substrate which is then laminated with the first substrate.

The invention is adaptable to various different applications. One application is a light valve, preferably employing liquid crystals as a light modulating medium. The holographic lenses are disposed on glass that is located on the opposite side of the liquid crystal medium from pixels which form the target areas. In a reflective mode the pixels are actually imposed upon a mirror which reflects incoming light back through the liquid crystal medium. The pixels are electrically addressed and the liquid crystal light modulation is locally controlled by the signal applied to each pixel, such that the output display represents an accumulation of the individual pixel states. The incoming light converges onto the pixels from the lenses, but then diverges again and passes back through the holographic lenses after reflection so that the various colors are superimposed upon each other. This offers a significant improvement in picture quality, since it eliminates the prior need for the observer to visually integrate separate color stripes into an overall image.

Another application is a backlit color display panel. The display panel operates in transmission mode so that the incoming light passes through a first holographic lens assembly and the pixel array and diverges. A second output holographic lens assembly may be used to collect the diverging light after transmission through the pixel array and superimpose the various colors upon each other. The output lens assembly may also be designed to achieve a predetermined viewing angle.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
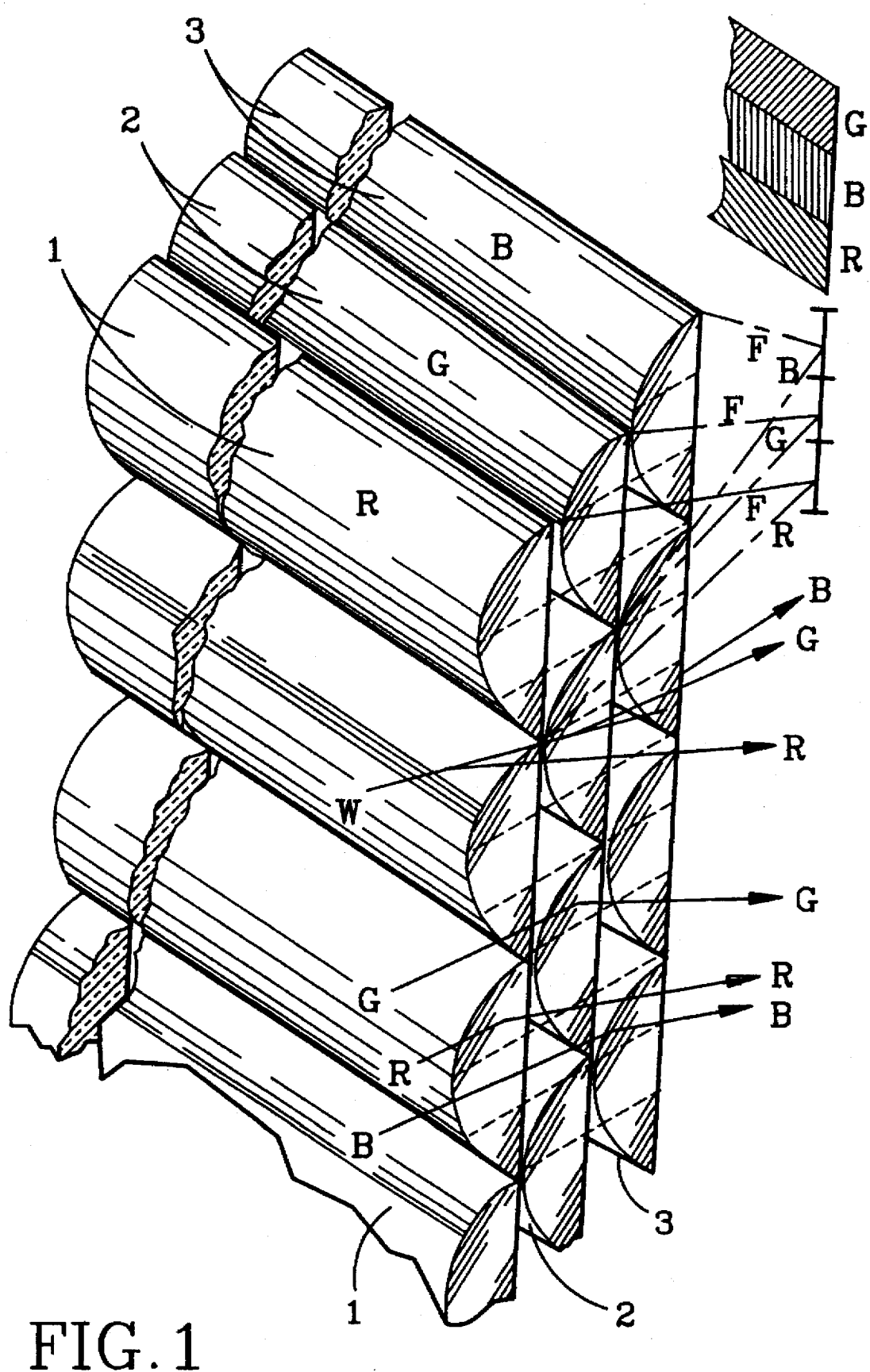
FIG. 1 is a perspective view of a theoretical lens system which is equivalent to the lens system of the present invention for purposes of describing the invention.

A lens system is illustrated in FIG. 1 which is functionally equivalent to the lens system of one embodiment of the present invention, and is useful in illustrating the principles of the invention. Separate series of red, green and blue lenses 1, 2 and 3, respectively, are arranged with each lens of a common color lying in a single plane, and the different color planes lying directly one behind the other. The lenses are shown as convex glass devices for purposes of illustration. In actual practice, holographic lenses are preferred which may be formed either in separate planes as illustrated, or in a generally common plane.

Each lens is responsive to only one color or, more precisely, to a band of radiation wavelengths centered upon only one color. The lenses are adapted to have a focusing effect upon light within their respective wavebands, the fraction of light being focused depending upon how far the particular wavelength of interest is from the center of the color band; the fraction of light being focused generally decreases with increasing distance from the center wavelength. Each of the lenses generally transmits light outside of its waveband without a substantial percentage being focused.

The lenses for the various colors are arranged in a staggered order, such that the lenses for any one color are offset from the lenses of the other colors by equal amounts. Thus, a ray entering the lens matrix from the rear will pass through a lens for each of the different colors. The staggered lens arrangement results in focal points for the different color lenses at regularly spaced intervals along a focal line which is essentially parallel to the lens plane; the focal points for one set of red, green and blue lenses is illustrated by points $F_R$, $F_G$ and $F_B$ in FIG. 1.

With lenses for three different primary colors, each lens is offset from the lenses for the other colors by approximately one-third of its area to produce the desired color separation. This is illustrated in FIG. 1 by the dashed line extensions from the ends of each lens, which can be seen to extend through corresponding lenses for the other colors at about one-third the lens widths from their extremities. The lenses are designed so that light at the center wavelengths of their respective wavebands is focused directly onto the focal point of the lens, while light that is still within the waveband but is further removed from the center wavelength is only partially focused. Light at the end of each waveband is focused to a point midway to the center focal point of the next adjacent lens. Thus, with lenses for three different colors, the distance between the focal points for the different color lenses will be one-third the widths of the lenses themselves. Since the planar face of each lens occupies an area, light within its waveband will be focused to an area stripe; three such color stripes are indicated in the inset at the upper right of FIG. 1. Accordingly, the focal plane area A occupied by light within the full waveband for each lens will be one-third the area of the lens itself. This concept can be extended to a generalized case in which the input radiation is to be divided into n waveband components, with the target area for each lens equal to A. In this case the area of each lens will be approximately nA, and each lens will overlap the next adjacent lens by (n−1)A/n.

The action of the lens assembly upon incoming light rays is illustrated in the lower portion of FIG. 1. A ray of white light, labeled W, consists of red, green and blue waveband components. The ray initially reaches a red lens, which diffracts (for a holographic lens) the portion of the ray within the red waveband and transmits the remainder of the ray without substantial change. The ray then reaches a green lens, which diffracts the radiation within the green waveband and transmits the remaining blue band radiation. Finally, the remaining blue band radiation reaches a blue lens, where it is diffracted onto the focal area for that lens.

The transit of red, green and blue (R, G and B) light rays through the lens assembly is also illustrated. It can be seen that each ray is transmitted without substantial change through the other color lenses, and diffracted only by its own color lens. Thus, substantially all of the incoming light is processed through the lens assembly and reaches the target area. This offers a great improvement in efficiency when compared to prior color displays, in which most of the light is excluded from the display area by absorption in the lens itself.

Referring back to the upper portion of FIG. 1, it can be seen that each lens focuses light within its waveband onto a discrete target area, illustrated as color stripes in the inset, thereby providing full color separation. The separate target areas can then be operated upon to eliminate, reduce or otherwise modify the light incident thereon before it is displayed. In this manner incident white light can be separated into its different color components, with each component either included or excluded from the ultimate display. Furthermore, it will be noted that each lens causes light within its waveband to converge onto its respective target area, which is smaller than the lens itself. After reaching the target area, selected portions of the converging light can then be reflected back through the lens assembly, or transmitted on past the target area. In either case the reflected or transmitted light will exhibit an angular divergence, rather than convergence, as it leaves the target area. If the light is reflected back through the lens assembly, the various colors are automatically superimposed upon each other. If the light is transmitted on past the target area, a second holographic lens assembly may be employed to superimpose the various colors upon each other. This significantly enhances the resolution of the display, as compared with prior art displays in which the eye has to integrate the intensities from separate color stripes to perceive the desired color hue. In a transmission mode device, the second lens assembly may also be designed to achieve a desired viewing angle. Examples of specific applications for these principals are provided below.

The design of the individual holographic lenses is important; they should be responsive to sufficiently wide wavebands of light so that all incoming light is subject to diffraction onto the proper target area, but the wavebands should not be so wide that adjacent lenses significantly interfere with each other. The first holographic lens, called the "red" lens, is designed to diffract red light most efficiently, and to direct the diffracted light onto the red stripe or target area of the matrix display. However, the red lens also diffracts at other wavelengths both above and below the red peak wavelength. An intrinsic property of holograms is that light of different wavelengths incident upon the hologram is diffracted at different exit angles; this property is known as chromatic dispersion. The amount of dispersion can be controlled by controlling the spacing of the lens fringes—the more closely spaced the fringes (and consequently the farther off-axis the angle of incident light with respect to the exit rays), the greater the dispersion effect. Therefore, the red holographic lens is preferably designed so that the light diffracted from it will be incident on the matrix display target area in a rainbow-like fan of rays, with the deep red, red, orange-red and orange light illuminating the "red" display stripe, the yellow-green, green and blue-green light illuminating the "green" matrix display stripe, and the blue, indigo and violet light illuminating the "blue" matrix display stripe. The output lens integrates the colors so the viewer can not see the individial color stripes (or color pixels). In a similar manner, the green holographic lens is designed to diffract most efficiently in the green portion of the spectrum, and the "blue" lens is designed to diffract most efficiently in the blue portion of the spectrum, but both lenses are designed to diffract light of all wavelengths into their appropriate stripes on the matrix display.

Care must be exercised in designing the spectral bandwidths of each of the three holographic lenses. If the bandwidths are very wide, each lens will diffract both blue, green and red efficiently, which will result in color crosstalk problems. For example, red light diffracted by the red lens towards the intended stripe on the matrix display would be partially re-diffracted by the green lens into an unwanted location. The effect of color crosstalk is to reduce the color purity of the light incident on the matrix display. On the other hand, designing the spectral bandwidths to be very narrow results in an appreciable amount of incident light passing undiffracted through all three lenses onto unwanted locations on the matrix display, resulting once again in reduced color purity and contrast.

Figure 2A:
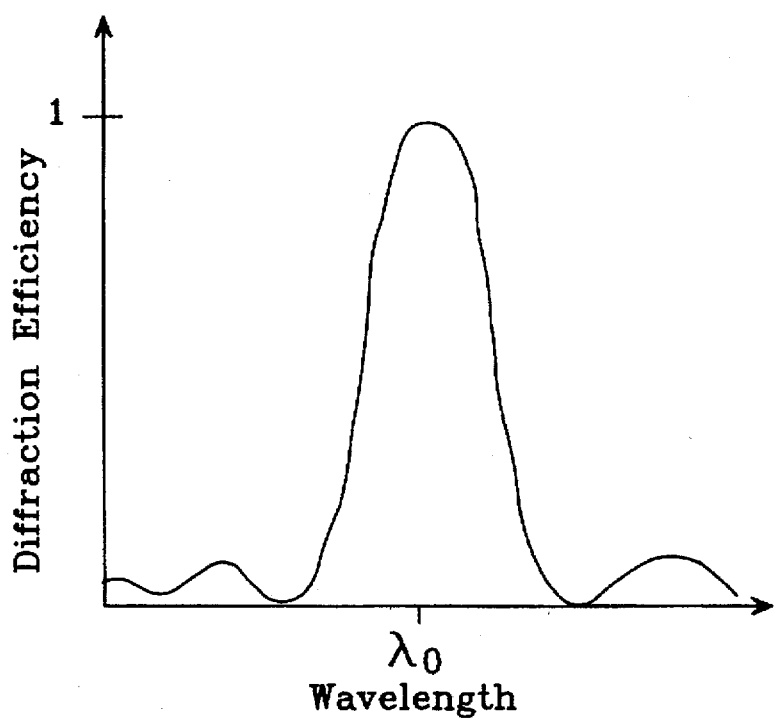
FIG. 2a is a graph illustrating the wavebands of typical lenses employed in a prior holographic lens assembly.

In the '978 patent, each holographic color lens is implemented with a single hologram, with the spectral bandwidths of each color hologram designed to lie between the two extremes described above. For each lens the diffraction efficiency is greatest for wavelengths at the center of its waveband ($\lambda_o$), and generally progressively decreases with increasing distance from the center, as illustrated in FIG. 2a. The "waveband" for each lens may be considered to be that portion of the spectrum in which its diffraction efficiency is greater than 50% of the peak efficiency (which can be as high as 100%). While the lenses only reach 100% diffraction efficiency at their center wavelengths, they may be described as being generally diffractive at wavelengths within their respective wavebands, and generally transmissive at other wavelengths. Since volume transmission holograms are capable of diffraction efficiencies of virtually 100% at the peak wavelength, careful design of the single hologram spectra for each lens can result in overall efficiencies of 80%–90%.

For many display applications, overall efficiencies of 80%–90% are acceptable. However, for some display applications it is desirable to achieve substantially 100% diffraction efficiency over substantially the full waveband of each color lens. A feature of the present invention is the ability to achieve this kind of diffraction efficiency by providing a plurality of spectrally customized holograms (a spectrally customized hologram set) for each color lens. Each hologram in the set is responsive to a discrete radiation waveband centered about a discrete peak response wavelength, with the separation between the peak response wavelengths chosen so that the radiation wavebands of the holograms partially overlap. The cumulative diffraction efficiencies and spectral bandwidths of the individual customized holograms result in a lens with substantially 100% diffraction efficiency over a larger spectral bandwidth than can be achieved using only a single hologram.

Figure 2B:
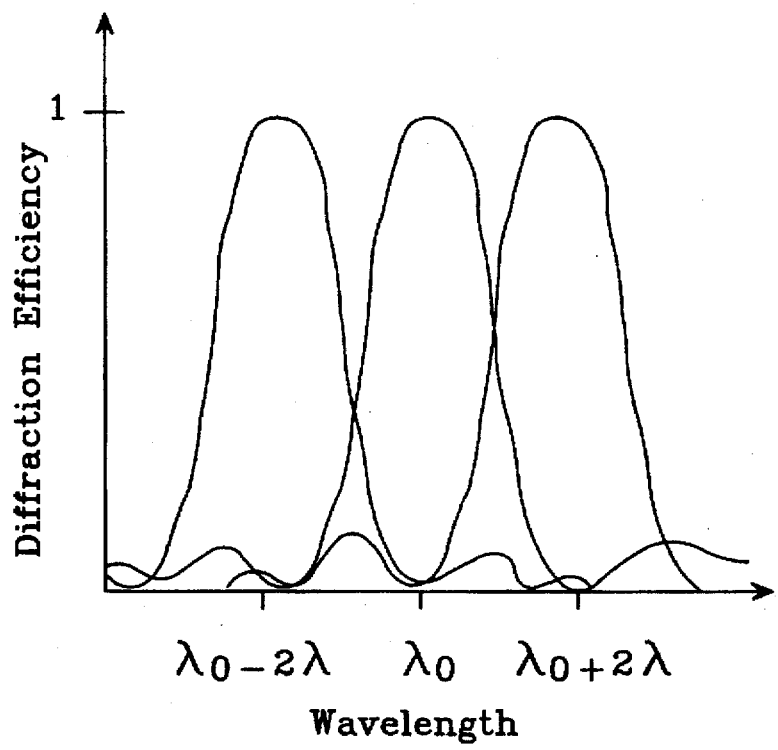
FIGS. 2b and 2c are graphs illustrating the spectral bandwidth of holograms employed in the present invention.
Figure 2C:
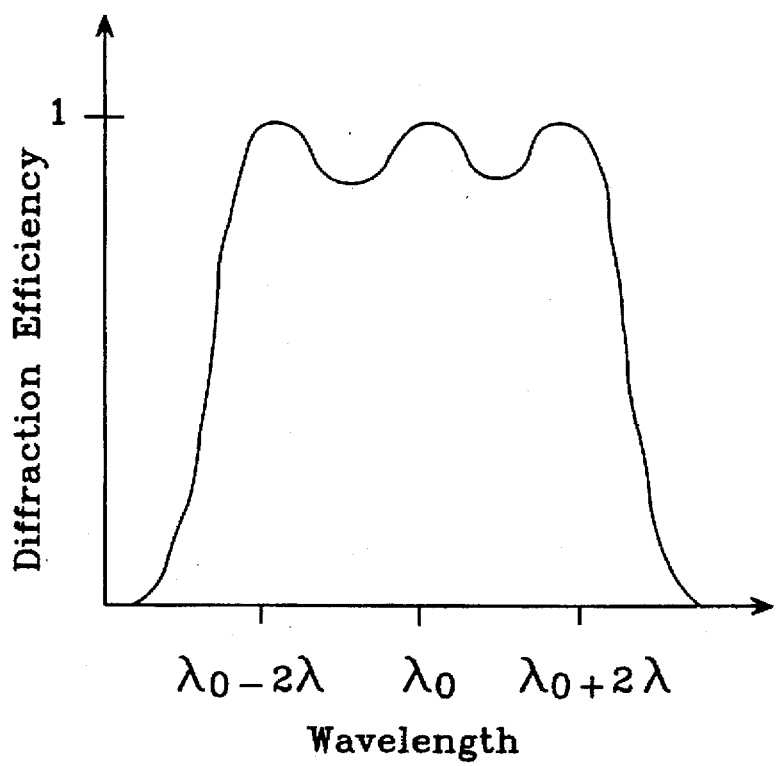

As an illustrative example, three customized holograms can be used to make up the spectrally customized hologram set for a color lens having a center response wavelength of $\lambda_o$. Assuming that the bandwidth of a single hologram is equal to $\pm\Delta\lambda$, the first customized hologram would have a peak diffraction efficiency at wavelength $\lambda_o$, the second at $\lambda_o-2\Delta\lambda$ and the third at $\lambda_o+2\Delta\lambda$, as illustrated in FIG. 2b. The resulting spectrally customized hologram set has a center response at wavelength $\lambda_o$ and an effective bandwidth of $6\Delta\lambda$ ($\lambda_o\pm3\Delta\lambda$). In addition, the customized hologram set exhibits an overall diffraction efficiency of substantially 100%, as illustrated in FIG. 2c. The number of holograms in a set and the peak response wavelength separation between them (the value of $\Delta\lambda$) are adjusted to achieve the desired cumulative spectral bandwidth.

Figure 3A:
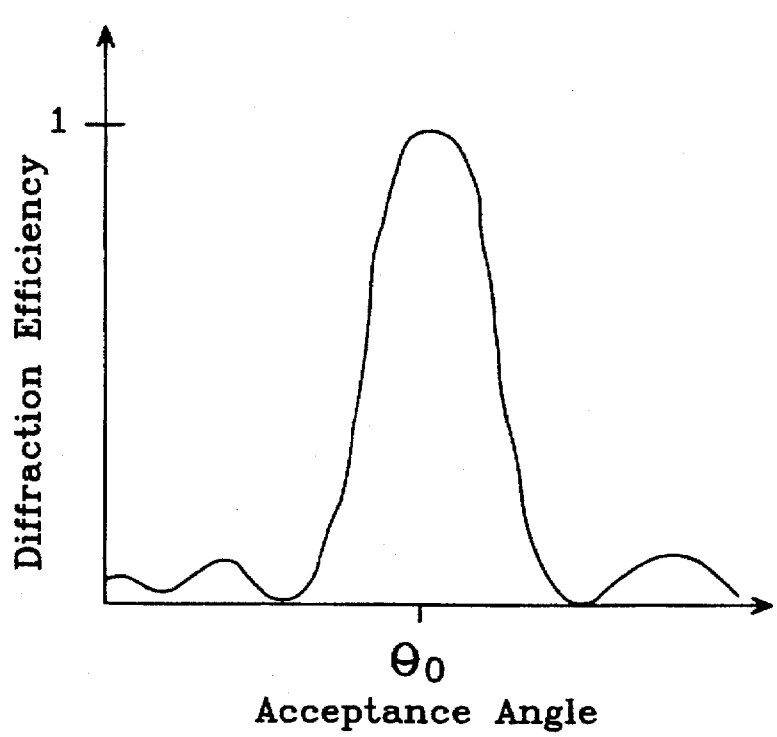
FIG. 3a is a graph illustrating the angular bandwidth of a typical hologram.

The diffraction efficiency of a hologram also depends upon the angle of incidence of the input beam. Generally, holograms exhibit a peak diffraction efficiency at a discrete peak acceptance angle $\theta_o$, with a progressively diminishing diffraction efficiency as the input beam angle of incidence moves away from the peak acceptance angle, as illustrated in FIG. 3a. The acceptance angle range for a hologram (and hence for the color lens) may be considered to be the angles at which its diffraction efficiency is greater than 50% of the peak efficiency (which can be as high as 100% for volume holograms). The angular bandwidth of prior display systems which use a single hologram for each color lens, such as the system disclosed in the '978 patent, is limited by the angular bandwidth of each individual color hologram. This bandwidth limitation reduces the color purity of the display system because a portion of the input light that is incident upon the holograms at angles away from the peak acceptance angle will pass through the holographic lens assembly undiffracted (the diffraction efficiency is less than 100% for angles other than the peak acceptance angle). This undiffracted light will strike random target areas and will frustrate the color separation (color purity) of the device. For projection-view systems in which the image is projected onto a screen, color purity can be controlled to some extent by choosing the divergence and incidence angles of the illumination light so that it falls as close to the peak acceptance angle as possible. However, for direct-view systems in which a highly diverging illumination source is used to achieve a wider field of view, the relatively narrow bandwidth of the individual holograms results in a display device with inadequate color purity.

The present invention uses an angularly customized hologram set to achieve substantially 100% diffraction efficiency over a wider acceptance angle range than prior systems. Each hologram in the set is a conventional volume hologram with an acceptance angle range centered about a discrete peak acceptance angle, with the separation between the peak acceptance angles chosen so that the acceptance angle ranges of the holograms partially overlap. The cumulative diffraction efficiencies and acceptance angle ranges of the individual angularly customized holograms result in a lens with an overall diffraction efficiency of substantially 100% over a wider acceptance angle range than could be achieved using only a single hologram.

Figure 3B:
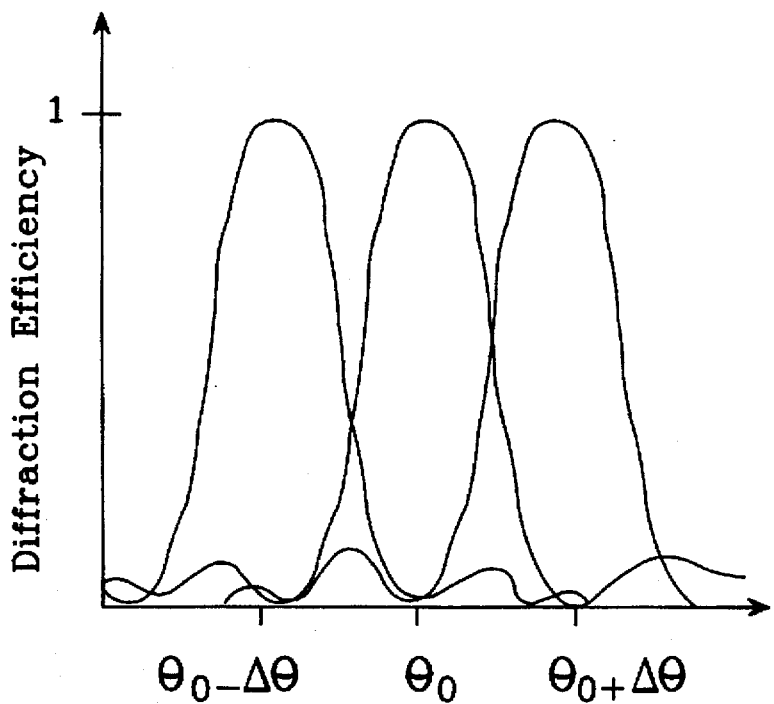
FIGS. 3b and 3c are graphs illustrating the angular bandwidth of a color lens employed in the present invention.
Figure 3C:
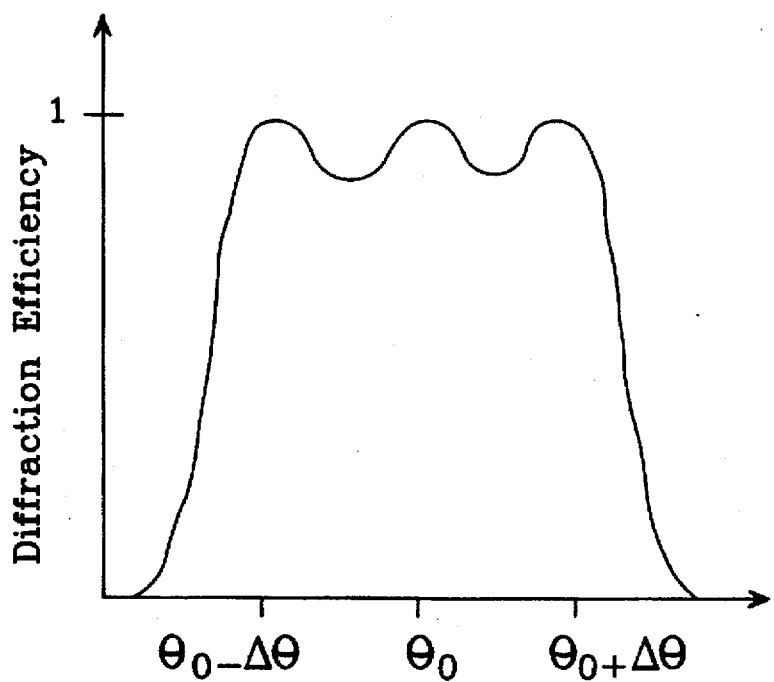

As an illustrative example, three angularly customized holograms can be used to make up the hologram set for a color lens having a peak acceptance angle of $\theta_o$. Assuming that the bandwidth of a single hologram is equal to $\pm\Delta\theta$, the first customized hologram would have a peak diffraction efficiency at angle $\theta_o$, the second at $\theta_o-2\Delta\theta$ and the third at $\theta_o+2\Delta\theta$, as illustrated in FIG. 3b. The resulting angularly customized hologram set has a center response at an acceptance angle of $\theta_o$ and an effective bandwidth of $6\Delta\theta$ ($\theta_o\pm3\Delta\theta$). In addition, the customized hologram set exhibits an overall diffraction efficiency of substantially 100% over a larger angular bandwidth than could be achieved with a single hologram, as illustrated in FIG. 3c. The number of holograms in a set and the peak response angle separation between them (the value of $\Delta\theta$) are adjusted to achieve the desired cumulative angular bandwidth.

Another feature of the present invention is the ability to design each of the individual holographic color lenses so that they reject illumination light that falls outside a predetermined acceptance angle or wavelength range. This is particularly useful in display devices that utilize a highly diverging and/or broadband illumination source. For example, even if the angularly customized hologram sets for each of the color lenses are designed with a wide angular bandwidth (such as ±15°), it is still possible that illumination light falling outside of this angle of incidence range will strike the lens assembly, resulting in a reduction in the color purity of the display device, as discussed above. This problem can be addressed by adding one or more reflection holograms to the angularly customized hologram set of each color lens. Like transmission holograms, reflection holograms are responsive to light that falls within their respective angular and spectral bandwidths. Thus, the angular and spectral bandwidths of the reflection holograms can be designed so that they reflect light that falls outside of the desired angular range of the display device. As an illustrative example, if the angularly customized hologram sets in each color lens are designed to focus light within an angular range of $\theta_o\pm15°$, then two reflection holograms could be incorporated into the hologram set, with one designed to reflect light at angles of greater than $\theta_o+15°$ and the other to reflect light at angles of less than $\theta_o-15°$. In this way, illumination light that falls outside of a desired angular range can be rejected.

Similarly, one or more reflection holograms may be added to each spectrally customized hologram set that are designed to reject light with a wavelength that falls outside a predetermined wavelength range. This is particularly useful for devices that utilize highly broadband illumination sources.

The spectral and angular bandwidth controls described above may be implemented independently or concurrently, depending upon the particular device requirements. For example, in projection-view systems the illumination light source may be controlled so that angular bandwidth is not an issue, but one may still want to increase the spectral bandwidth of the lenses. In this situation, multiple spectrally customized holograms would be used to increase the spectral bandwidth. Conversely, the spectral bandwidth of a single hologram may be sufficient for a particular device application, but the angular bandwidth may be insufficient. In this situation, multiple angularly customized holograms may be used for each lens for the purpose of increasing the angular bandwidth. Finally, there may be display applications where the spectral and angular bandwidths of a single hologram are both insufficient. In this case, multiple angularly and spectrally customized holograms may be used to increase both the spectral and angular bandwidth of the device. For example, if three spectrally customized holograms are needed to increase the spectral bandwidth (such as the example illustrated in FIGS. 2b and 2c) and three angularly customized holograms are needed to increase the angular bandwidth (such as the example illustrated in FIGS. 3b and 3c), the spectral and angular bandwidths could both be increased by providing nine holograms for each color lens (three separate peak acceptance angles for each peak response wavelength).

Figure 4:
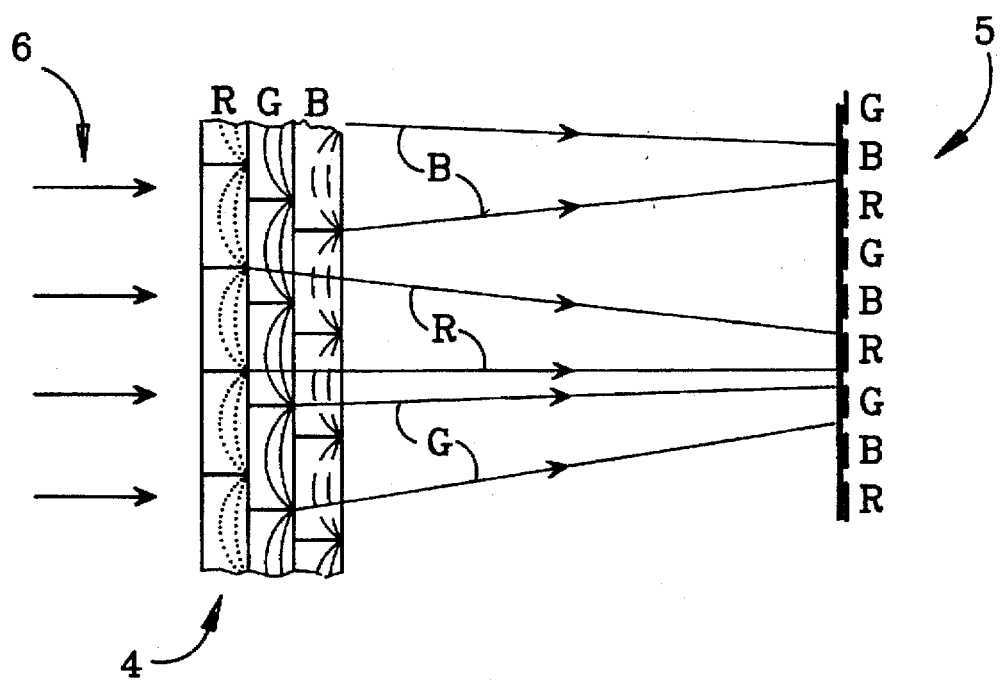
FIG. 4 is schematic diagram illustrating the focusing effects of a holographic cylindrical lens array.
Figure 5:
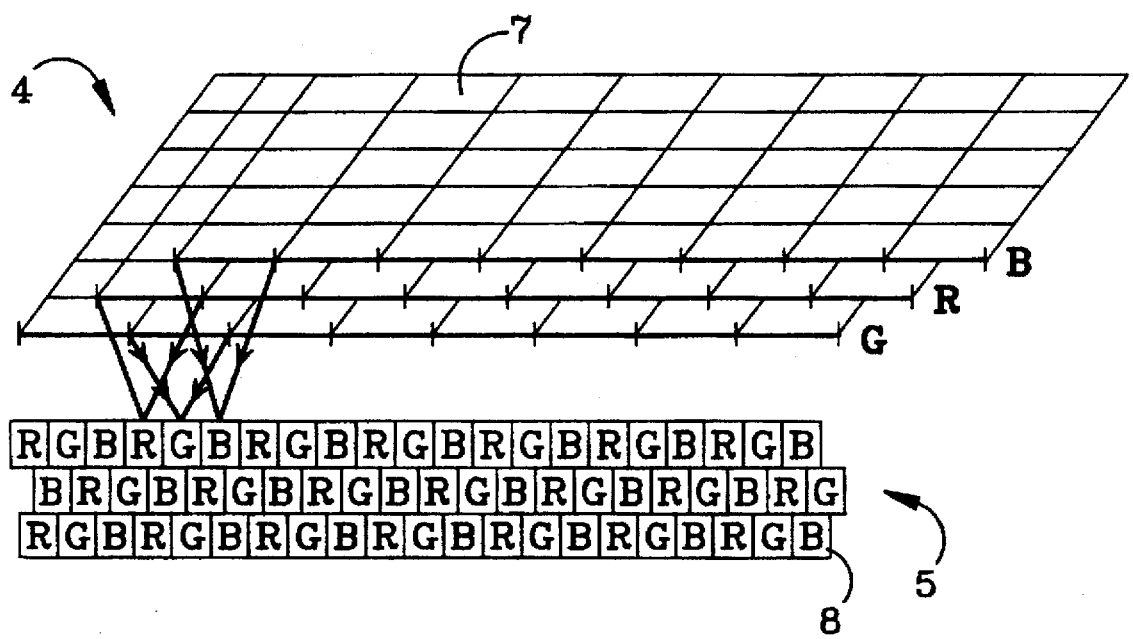
FIG. 5 is a schematic diagram illustrating the focusing effects of a optically spherical holographic lens array.

The description thus far has been limited to cylindrical holographic lenses which simulate the performance of the cylindrical lens array shown in FIG. 1, and which focus incident light only in one dimension. This is illustrated in FIG. 4, in which a cylindrical lenslet within a holographic cylindrical array 4 is shown focusing RGB components of incident white light 6 onto respective pixel cells of a "stripe" target 5. Everything said so far would apply equally well to a holographic lens that focuses light in two dimensions, such as the one illustrated in FIG. 5, in which the individual hoographic lenslets 7 that make up the holographic lens array 4 are geometrically rectangular but consist of spherical hologram fringes (not shown) that focus the light in two dimensions. In this type of holographic lens, the geometrical dimension of each of the lenslets 7 is preferably three times the dimension of a pixel cell 8 in one dimension, and equal to the dimension of a pixel cell 8 in the orthogonal direction. The geometrical shape of the pixel cells 8 and the lenslets 7 may vary for particular device applications. For example, they may be close-packed hexagonal instead of the rectangular shape illustrated in FIG. 5.

Figure 6A:
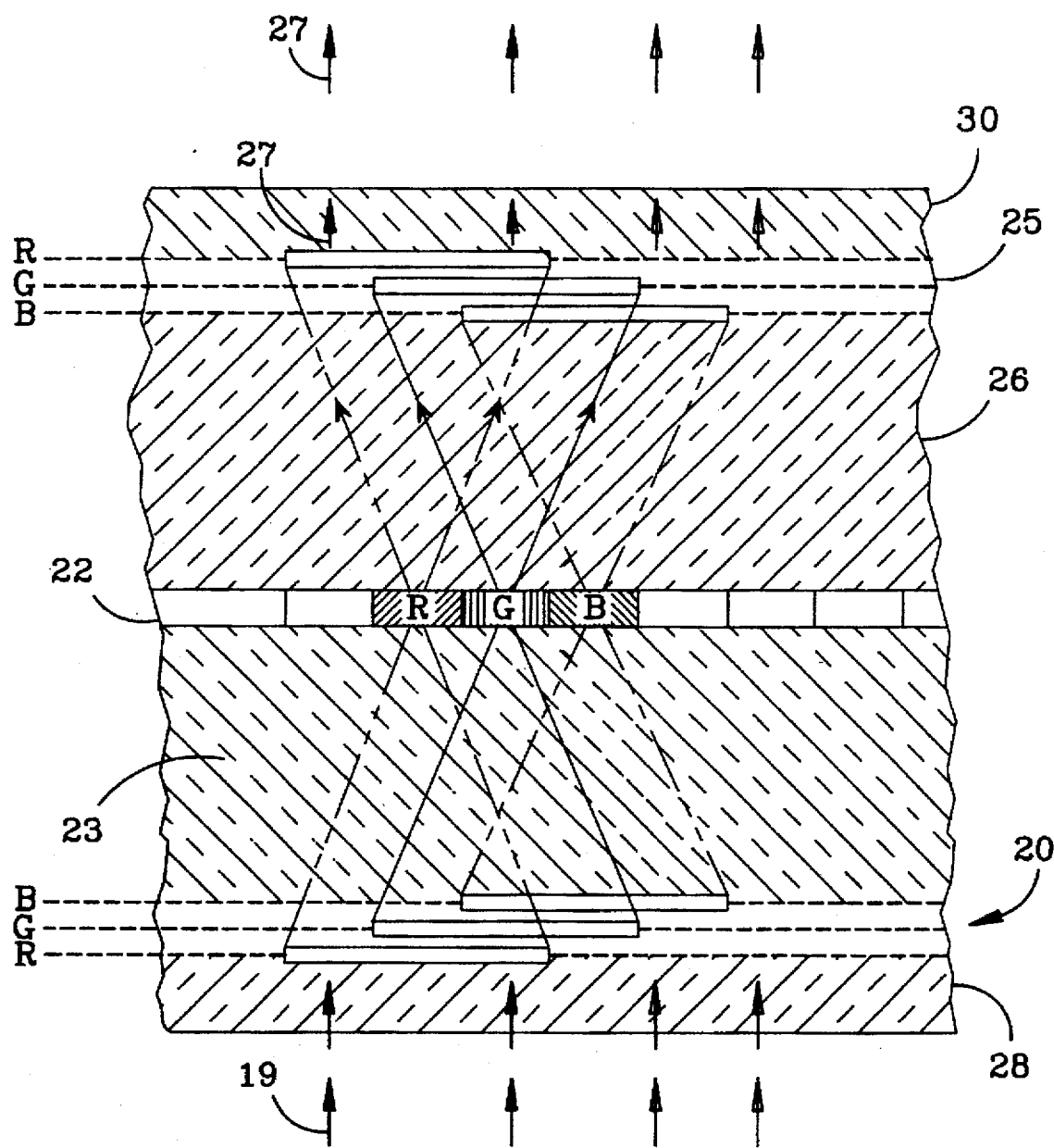
FIG. 6a is an enlarged illustrative view of a transmissive color display incorporating the present invention.

One application of the invention is in a transmissive color display device, as illustrated in FIG. 6. In this application a lens assembly consisting of multiple series of repeated red, green and blue holographic lenses 20 as described above are provided. The lenses are aligned with an array of individual light modulating matrix cells 22, preferably liquid crystal matrix cells. The cells are typically 0.01 to 0.5 mm square, and are typically spaced from the lenses by about 0.1–3.81 mm by a transparent glass spacer 23. The cells are arranged so that the red-containing information is located in a column or "stripe" of cells, the green-containing information is in an adjacent stripe, and the blue-containing information is in another adjacent stripe, with the pattern repeated over and over.

Input white light 19 is directed onto the lenses 20, which are preferably 0.03–1.5 mm wide transmission hologram sets. The divergence of the input light 19 will depend upon whether the display is a projection display or a direct-view display. For a projection display, the input light 19 will typically originate from a projector (not shown) and will be collimated by a field lens (not shown). For a direct-view display, such as a flat panel display, highly diverging light will typically be used as the input light 19. The three hologram planes are shifted by ⅓ of the hologram period width with respect to each other, to yield identical diffracted beam geometries. Other registrations between the holograms are possible, but the 0.01–0.5 mm shifted registration is preferred, with a value of about 0.0254 mm typically being suitable for a projection display and about 0.254 mm typically being suitable for a flat panel display.

The high diffraction efficiencies exhibited in these hologram sets, as illustrated in FIGS. 2b, 2c, 3b and 3c, are only possible for dichromated gelatin film when the angle between the incident and diffracted rays is fairly large (no smaller than 10 degrees). For portions of the hologram which diffract less than 10 degrees with respect to the incident angle, the diffraction efficiency is significantly reduced, and a substantial portion of the incident light passes through. Each hologram lenslet (hologram set) has a central region in which the diffraction angle is very small, and therefore a substantial portion of the incident light passes through the hologram. However, as long as the low diffraction region is no wider than the width of the target, the holographic lens assembly effectively separates white light into red, green and blue color components. For example, assume white light is incident upon the red hologram set, as in FIG. 6. Assuming that the low efficiency region of each hologram is ⅓ the hologram period width, or equal to the target width, the red portion of the white light incident upon the outer ⅔ of the red hologram set will be efficiently diffracted to the red target, while the blue and green light will pass through. In the central ⅓ of the red hologram set, white light will pass through substantially unimpeded. However, the blue and green portion of the white light will be diffracted to the proper targets by the subsequent blue and green hologram sets, respectively. The red portion of the white light transmitted through the red hologram set will pass through the blue and green hologram sets to the red target. Similarly, a substantial portion of the blue and green light will also reach the proper targets as long as the low-efficiency central region is narrow enough. Assuming that the low efficiency region is for bend angles of 10 degrees or less, the f-stop of the hologram sets must be approximately 1.0, where the f-stop is the ratio of the lens-to-display distance to the lens dimension.

On the other hand, for other reasons it is advantageous to make the f-stop relatively large. One reason is that the holographic lens diffraction properties vary as a function of the exit angle of the diffracted ray. In a low f-stop system in which the lens is designed to be close to the matrix display, the exit angle of diffracted rays vary significantly from one side of the lens to the other, and so also do the performance properties of the lens. Therefore, it may be difficult to design all points on the lens to perform optimally; the result is reduced efficiency and color contrast. Another reason is that the rays focusing down from the holographic lens to the narrow matrix display stripe fan out on the other side of the matrix cell in a diverging beam. For applications in which the exit pupil is small and highly localized, such as in an airplane cockpit, the fan of rays exiting from each matrix display cell in a low f-stop system may be unnecessarily wide, resulting in a degraded display brightness. Furthermore, most transmissive liquid crystal matrix displays lose image contrast when the image beam deviates appreciably from normal. Therefore, the beam incident upon the matrix display should not have too low an f-stop. On the other hand, if the lenses are too far removed from the matrix display surface, then precise registration of the rays diffracted by the holographic lens to the matrix display may become difficult.

The holographic lens can be designed to achieve an acceptable level of image contrast while still maintaining acceptable color purity. Taking the green holographic lens as an example, the lens may be designed to achieve a contrast ratio of 400:1, assuming that 3 micron thick liquid crystal matrix cells 22 are used with a birefringence of 0.1, by making the lens approximately 25 microns thick and spacing it approximately 90 microns from the liquid crystal matrix cells A second holographic lens assembly 25 may be used at the output end of the device to recombine the different color stripes. This eliminates the need for the viewer to visually integrate the intensities of separate color stripes. The lens assembly is preferably spaced from the cells 22 by a second transparent glass spacer 26. For illustration the first and second lens assemblies are shown as identical lens assemblies symmetrically positioned on the input and output sides of the matrix cells 22. In this configuration, the color stripes will be recombined into an output beam 27 with the same size and divergence as the original input beam 19. However, the second lens assembly may have a different design than the first lens assembly to accommodate particular device performance requirements. For example, the first lens assembly 20 may be designed to achieve efficient utilization of the input light source (as described above) while the second lens assembly 25 may be designed to achieve a desired viewing angle.

Figure 6B:
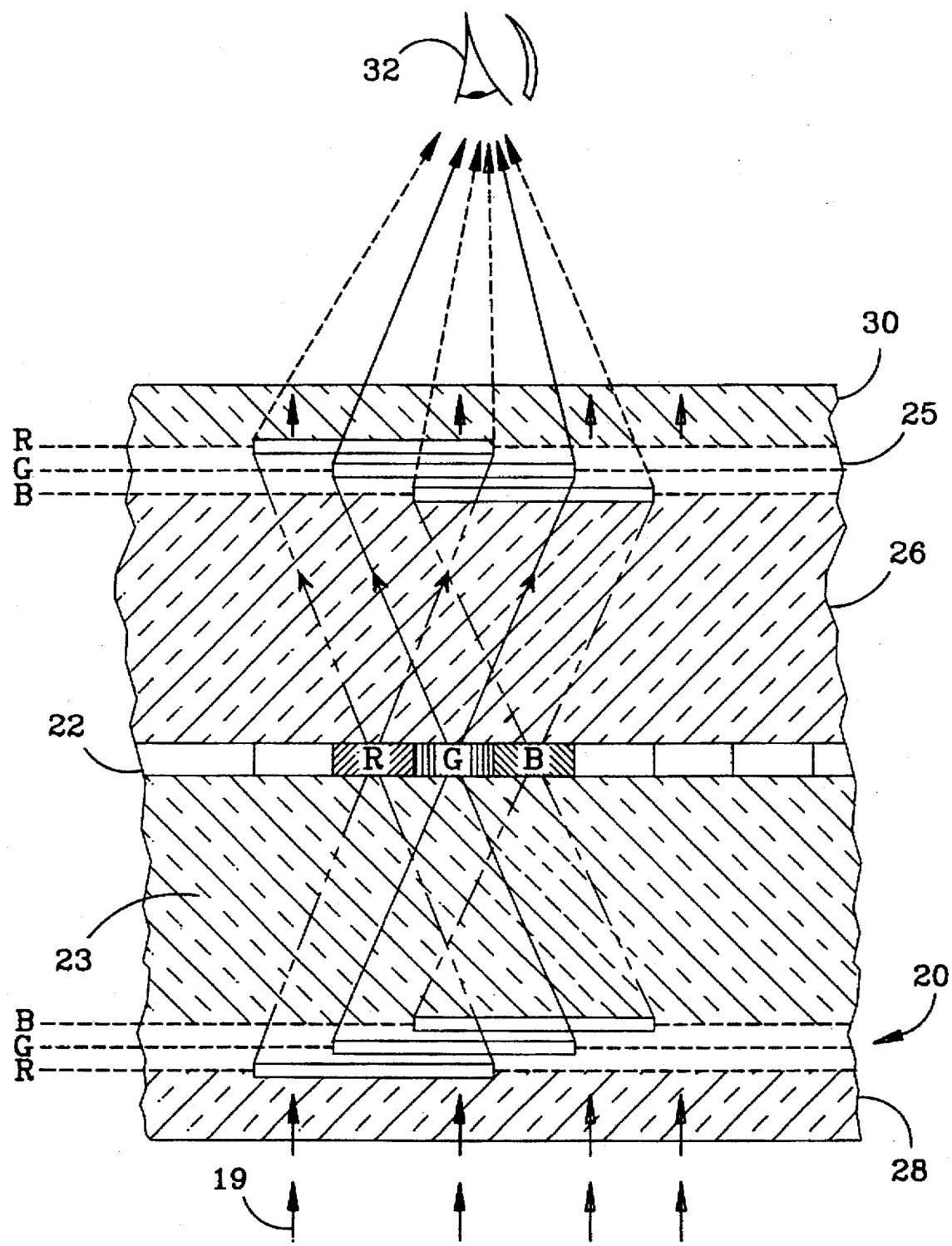
FIG. 6b is an enlarged illustrative view of a transmissive color display incorporating an output lens assembly designed for Head Mounted Displays.

An application for which the output lens assembly may be customized is Head Mounted Displays (HUDs). In HUDs, the display device is located in front of the eye and moves with the head of the user. Therefore, the relative locations of the display device and the eye remain constant and, as a result, only very narrow field of view (FOV) is needed. Generally, the FOV is defined by the eye aperture, the distance between the user's eyes, and the distance from the eyes to the device. As illustrated in FIG. 6b, the light efficiency of the display device may be improved dramatically by desigining the output cone angle of the output lens assembly 25 to match the required FOV, as defined above, and to tilt the cone angle of all the individual lenslets so that the light from each of the matrix cells 22 reaches the eye 32. This requires that substantially all the lenslets in the lens assembly 25 each have slightly different designs, with symmetry between the four quadrants of the output lens assembly 25.

If the lenses are designed so that they must be placed very close to the liquid crystal matrix cells 22 to achieve acceptable image contrast and color purity, glass covers 28 and 30 are preferably attached to lenses 20 and respectively, to achieve better device rigidity. The thickness of glass covers 28 and 30 may be adjusted to achieve a desired level of rigidity in the device.

The device employs an array of transistor-driven pixel electrodes to spatially control the matrix cell array 22. Each electrode, in combination with a light polarizer/analyzer (not shown), causes the liquid crystals in its vicinity to either transmit or reject incident light, whereby a desired output image can be produced from the accumulated pixel pattern. In a twisted nematic liquid crystal cell, the liquid crystal molecules are ordered such that plane-polarized light that passes through the cell is rotated 90°. When sufficient voltage is applied to the cell, the molecular axes of the liquid crystal molecules will orient themselves parallel to the applied electric field. Thus, polarized light will pass through the cell unchanged in the "switched" region and is blocked by the crossed analyzer. The polarization of the light will be rotated by 90 degrees in regions where the transistor-driven electrode is not activated, and therefore the light will be transmitted through the crossed crossed analyzer.

Figure 7:
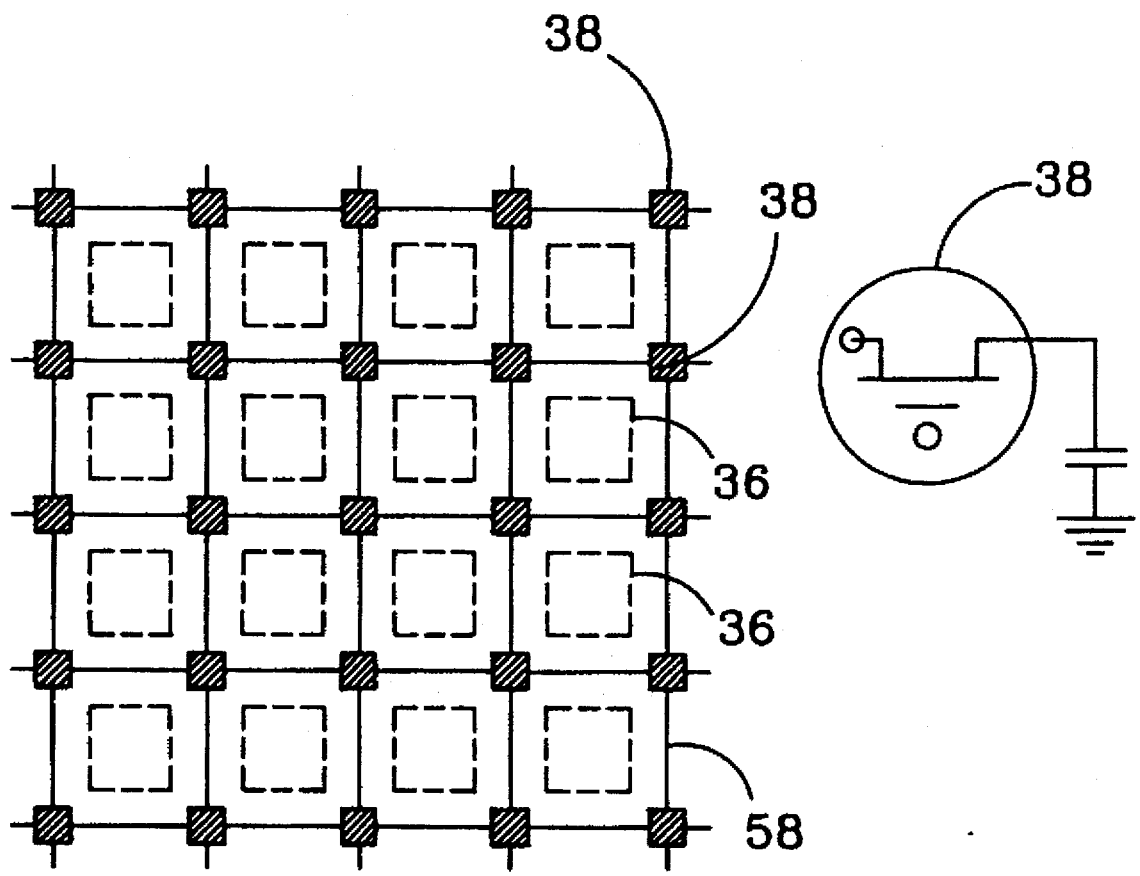
FIG. 7 is a simplified plan view of the display control system employed in the display of FIG. 5.

A transparent pixel electrode array suitable for this type of display is illustrated in FIG. 7. The pixel electrodes 36 are indicated in dashed line. The thin film silicon islands fabricated on a glass panel comprise the transistor switches 38, which as indicated are preferably FETs, and are connected by means of metal wire conductors 58 to an appropriate electrical gating control (not shown). In a preferred embodiment the transparent pixels 36 are squares of 0.01 mm–0.508 mm on each side.

Figure 8:
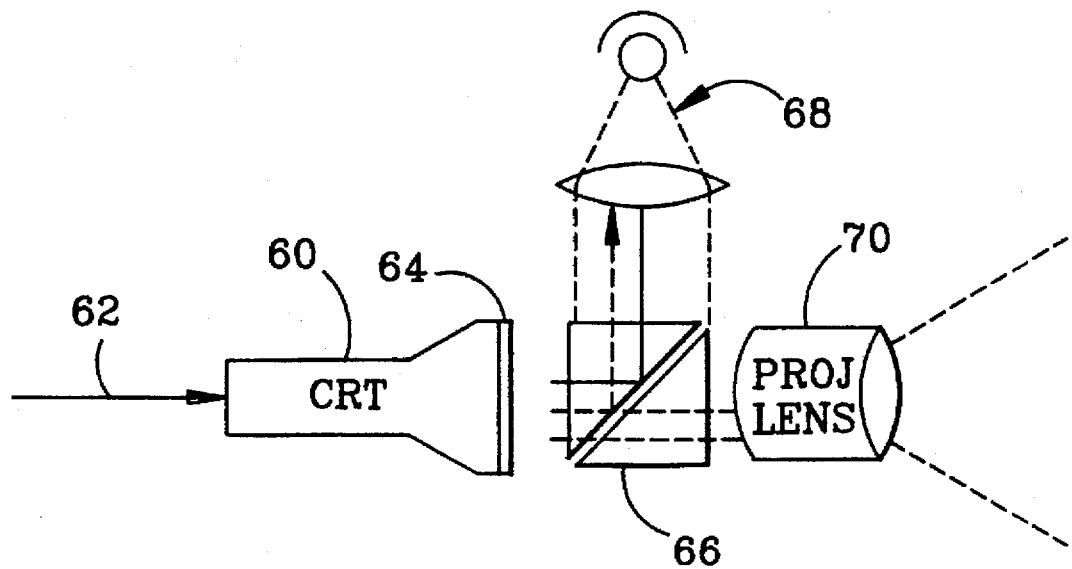
FIG. 8 is a block diagram of a photo-activated liquid crystal light valve projection system in which the present invention can be used.

Another application of the invention is in a photo-activated liquid crystal light valve (LCLV). Such an application is illustrated in FIG. 8, in which a fiber optic CRT 60 is shown receiving input data 62 and in response thereto providing a raster scanning output to LCLV 64. The LCLV output is processed through a polarizing beamsplitter 66 under the influence of a xenon lamp and condensor 68, such that desired portions of the LCLV output are directed onto a projector lens 70 for display. A system that uses a CRT to address an LCLV is the Hughes HDP-6000B Liquid Crystal Projector.

Figure 9:
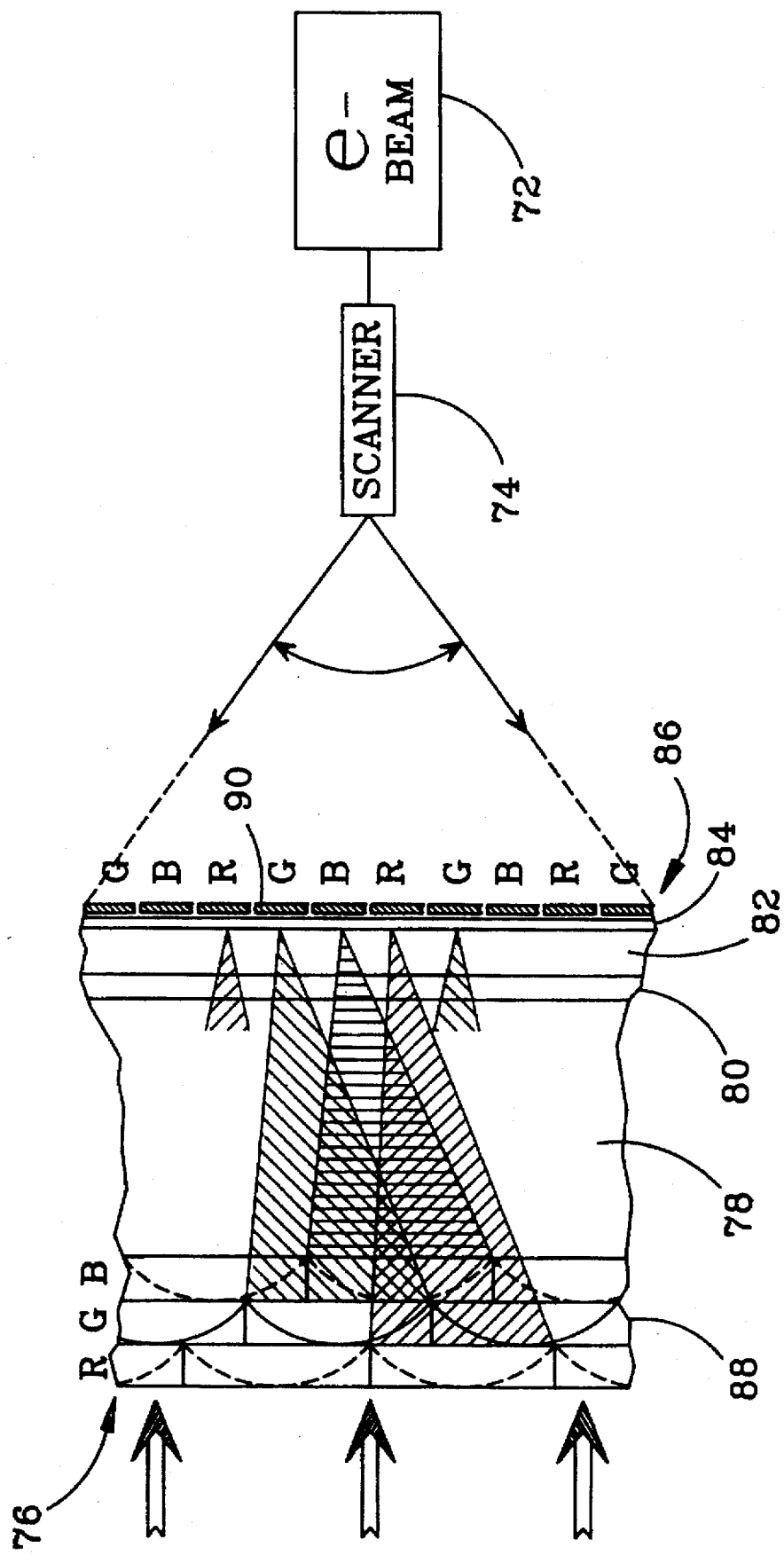
FIG. 9 is an enlarged illustrative sectional view of a liquid crystal light valve incorporating the present invention and controlled by an electron beam.

The present invention may also be applied to an electron beam addressed LCLV, such as the one described in U.S. Pat. No. 4,728,174, entitled "ELECTRON BEAM ADDRESSED LIQUID CRYSTAL LIGHT VALVE", issued Mar. 1, 1988 to Jan Grinberg, et al., and assigned to Hughes Aircraft Company, the assignee of the present invention. Such a system is illustrated in FIG. 9. In this type of application, the holographic cylindrical lens array or the holographic spheric lens array described in FIG. 5 may be used. The CRT includes an e-beam generator 72 and a scanner 74 which deflects the e-beam in a raster format. The LCLV consists of a three-color holographic lens assembly 76 as described previously, a transparent glass plate 78 which mounts the lens assembly on one side, a transparent conductive electrode 80 on the other side of the glass plate, a liquid crystal cell 82 adjacent the transparent electrode, and a broad band dielectric or metal matrix mirror 84 on the other side of the liquid crystal cell. An array of pixel landing pads 86 for the e-beam are arranged immediately behind the mirror 84. The transparent electrode sheet 80 is maintained at a constant voltage V, which might be ground potential, to provide a reference for the pixel electrodes. Each pixel landing pad is aligned with a corresponding color lens in the lens assembly 76; the electrodes are designated by color letters in FIG. 9 to indicate their corresponding red, green or blue lenses. The vertical dimension of each pixel electrode is approximately one-third that of its corresponding lens, while the pixel electrodes extend into the page for the same distance as the lenses.

In operation, the e-beam is scanned across the array of pixel pads and at the same time modulated in accordance with a desired signal pattern. Some of the pixel pads will be activated by the incident e-beam, as determined by its modulation pattern. The activated pixel pads will establish a voltage differential with respect to the reference transparent electrode sheet 80, causing the liquid crystal adjacent the pixel pad to modulate the polarized light from the lens assembly both towards and away from the mirror 84. The liquid crystal medium in the vicinity of the non-activated pixel pad will be oriented to prevent a two-way modulation of polarized light from the lens assembly.

Green light entering green holographic lens 88 will be diffracted onto the mirror 84 immediately in front of the green pixel pad 90. The light reflected off the mirror will be transmitted back through the liquid crystal medium 82 and collimated by lens 88 to produce a green output beam. Similarly, incoming blue and red light will be diffracted by the blue and red lenses onto their respective pixel electrodes and transmitted back through the liquid crystal medium to their respective lenses, which deliver collimated output light. By an appropriate modulation of the e-beam, any particular electrode can be fully activated, fully deactivated or partially activated, and the output light from that electrode will reflect its degree of activation. The modulation of the polarization of the read-out beam is translated into intensity modulation by the output analyzer (not shown). In addition to producing a highly efficient operation, the holographic color filter arrangement also superimposes each color on top of the other, rather than separating the colors as in the conventional color stripe approach. This produces a significant improvement in the system's resolution.

Figure 10A:
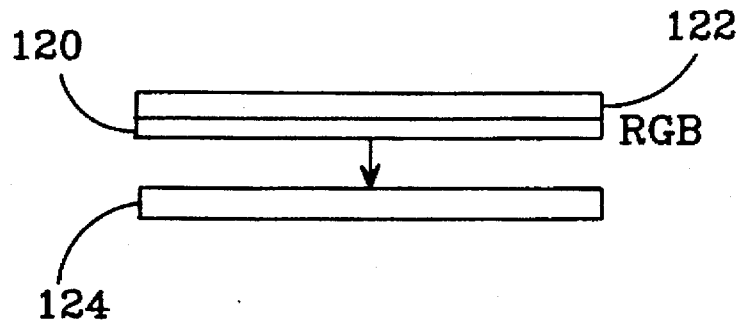
FIGS. 10a and 10b are elevation views illustrating different techniques for assembling the holographic lenses used in the present invention.
Figure 10B:
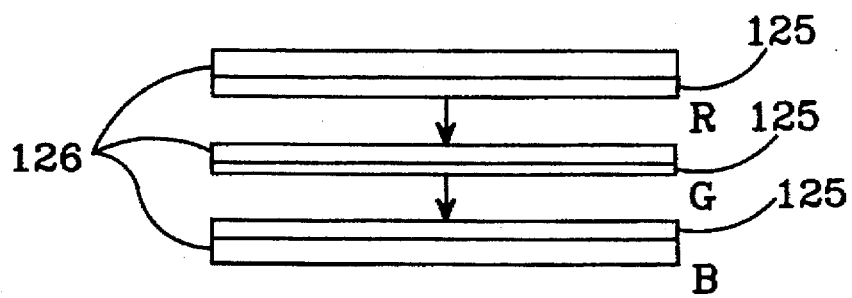

The construction of the holographic lens assembly itself will now be discussed in conjunction with FIGS. 10a and 10b. The simplest design, illustrated in FIG. 10a, would result if all three customized hologram sets could be exposed in a single gelatin film layer 120 on a transparent substrate 122, with a transparent cover plate 124 protecting the other side of the film layer. However, a single gelatin layer may not possess sufficient dynamic range in refractive index modulation to support three efficient transmission hologram sets. This can be resolved by designing the lens assembly so that the three hologram sets do not all lie in the same plane. For example, three separate hologram films 125, one for each color band, could be formed on three separate transparent substrates 126, and the resulting hologram plates stacked together as indicated in FIG. 10b.

A preferred process for fabricating the holographic diffusion lens array will now be described. For illustration, the fabrication of an angularly customized holographic lens array for one color having a peak acceptance angle of $\theta_o$ and an angular bandwidth of $\theta_o \pm 3\Delta\theta$ (where the angular bandwidth of a single hologram is $\pm\Delta\theta$) will first be described. Techniques for fabricating the lens arrays for all three colors with proper registration will then be discussed.

Figure 11:
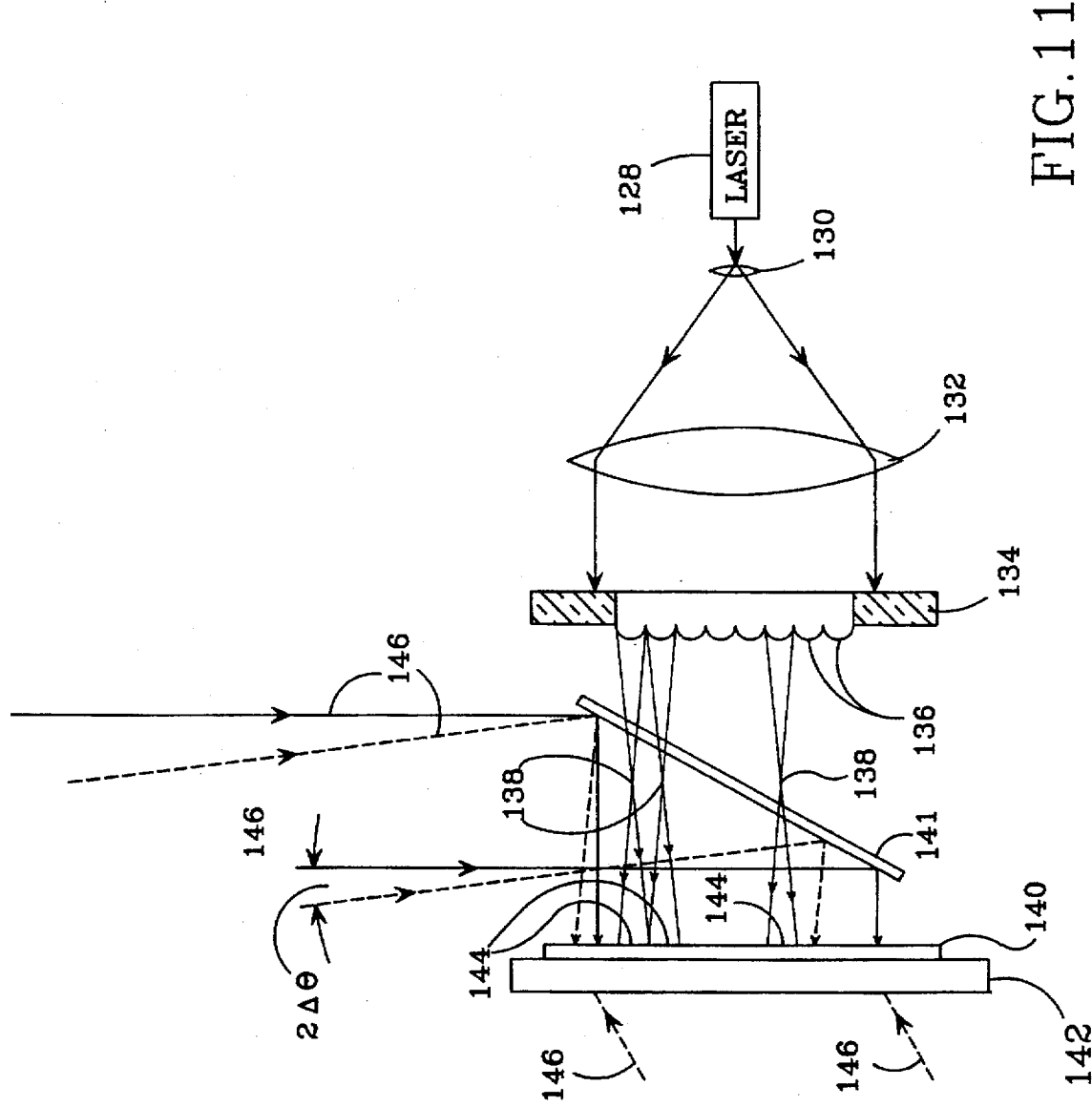
FIG. 11 is a block diagram illustrating a technique for forming the holographic lenses of the present invention.

The process for exposing a lens array for a single color is illustrated in FIG. 11. The technique is repeated for each color. For the first color (red, green or blue), a laser 128 which produces a beam of that color is directed towards a beam expander 130. The expanded beam is collimated by a collimating lens 132 and directed onto a glass or clear plastic plate 134. The opposite side of plate 134 has a series of adjacent half-cylinder lenses 136 which focus the incident beam to a series of crossover lines 138. The holographic lenses are formed in a gelatin film 140, which is carried on a transparent plate 142 on the opposite side of the beam crossovers from lenses 136. The plate 142 is positioned such that the successive lenses 136 are imaged onto the gelatin film 140 in adjacent image stripes 144. A reference beam 146 from the same laser 128 is directed onto the gelatin film 140 by means of a beamsplitter 141 along a separate path (not shown). In the normal manner of forming holograms, the periodic images of the beams from lenses 136 (the "object" beams) and the reference beam 146 produce an interference pattern in the gelatin film 140.

By using plate 134 with a series of half-cylinder lenses 136, all of the multiple adjacent holographic lenses are exposed simultaneously. However, it is possible to use a plate 134 with a single half-cylinder lens so that only one holographic lens is exposed at a time. After exposing the first holographic lens, the gelatin film 140 is horizontally translated with a computer stepper motor (not shown) to the position of the next holographic lens where, after a very short stabilization time, the next lens is exposed. Using this step and repeat process, the entire array of cylindrical lens holograms can be exposed.

The angle between the "object" beams and the reference beam 146 at the gelatin film 140 (the interference angle) determines the peak acceptance angle of the resulting hologram. Therefore, in order to expose an angularly customized hologram set with the angular bandwidth properties described above, successive exposures are made at interference angles of $\theta_o$, $\theta_o - 2\Delta\theta$ and $\theta_o + 2\Delta\theta$. If the step and repeat process described above is used, then the successive exposures are made at each holographic lens location before the film 140 is translated to the next location. The interference angle is preferably changed by keeping the angle of incidence of the object beams constant and adjusting the angle of incidence of the reference beam 146. Only two of the three angles indicated above are illustrated in FIG. 11 to avoid cluttering the figure.

The technique for increasing the spectral bandwidth of the lens array is similar in that multiple exposures are performed for each color lens array. Rather than changing the interference angle between exposures, the wavelength of the laser 128 is slightly shifted. For illustration, to achieve a lens array with a center response wavelength of $\lambda_o$ and an effective spectral bandwidth of $\lambda_o \pm 2\Delta\lambda$, a spectrally customized hologram set is formed by exposing holograms at wavelengths of $\lambda_o$, $\lambda_o - 2\Delta\lambda$ and $\lambda_o + 2\Delta\lambda$. As described above, the angular and spectral bandwidths of each color lens array may both be increased by exposing nine holograms for each hologram set (three separate peak acceptance angles for each peak response wavelength).

A reflection hologram may be added to the angularly and/or spectrally customized hologram set for each color so that light that exceeds a predetermined acceptance angle and/or a predetermined wavelength within that color's waveband is rejected by the lens assembly. The reflection hologram is exposed by directing the reference beam 146 so that it strikes the gelatin film 140 on the side opposite the object beams. The interference angle and/or the wavelength used to expose the reflection hologram will depend on the acceptance angles and/or the wavelengths that one wants to reject.

Figure 12A:
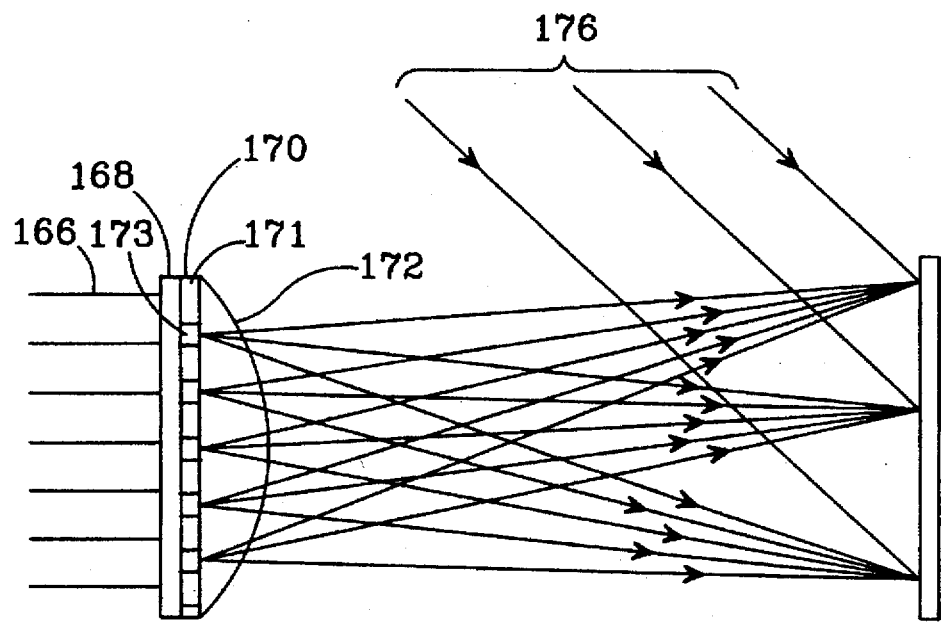
FIGS. 12a and 12b are block diagrams illustrating an alternative technique for forming the holographic lenses of the present invention.
Figure 12B:
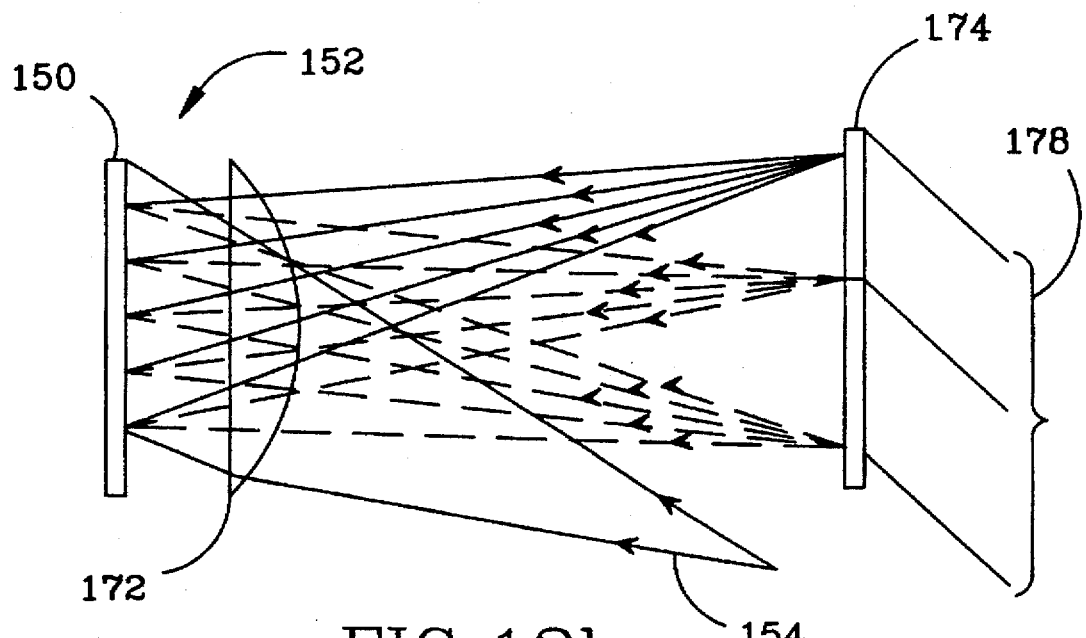

An alternate method of fabricating the holographic lens is illustrated in FIGS. 12a and 12b. For illustration, the formation of a green hologram set will be described. The first step in fabricating the green hologram set is to generate a reticle 170 with a striped mask pattern. The striped pattern is preferably specified in computer code, automatically drawn onto a Gerber plotter, and photo-reduced to a reticle having a striped mask pattern. The stripes consist of a repeated pattern of blackened stripes 171 separated by transparent stripes 173. Consistent with the previously described applications for the invention, each pattern would be 0.762 mm wide. Since chromatic dispersion creates a fan of rays diffracting from each hologram, the transparent stripes 173 should be somewhat less than 0.254 mm wide, but not so narrow such that too little light can pass through the reticle.

FIG. 12a illustrates the set-up for the second step in the fabrication—the exposure of an intermediate hologram. A collimated beam of laser light 166, which may have a 514.5 nm wavelength for an argon laser, is diffused by a ground glass screen 168, passes through the striped mask reticle 170, and is focused by a plano-convex spherical lens 172 onto a silver halide film plate 174. The focal length of lens 172 and the diameter of film plate 174 are chosen to create the desired f-stop in the eventual finished hologram set. At the film plane, interference between the focused image beam (called the object beam) and a collimated reference beam 176 creates a holographic recording in the film.

The final hologram exposure set-up is shown in FIG. 11b. In this set-up the partially exposed silver halide hologram 174 has the same relationship with respect to the plano-convex lens 172 as it did in the initial set-up of FIG. 12a. A collimated reference beam 178 of exactly reverse direction to the collimated beam 176 of FIG. 12a is directed onto the silver halide hologram, and is diffracted by the hologram towards the plano-convex lens 172 where the image of the reticle is focused at the back planar surface of the lens. A verification of this focus can be obtained by placing the striped reticle 170 on the planar surface of lens 172 and adjusting its orientation until the reticle image passes completely through. Then, by translating the reticle 0.254 mm sideways, the image light transmitted through it should be almost eliminated. In this manner the correct focus and spacing of the reticle image can be verified.

An alternate verification technique is to expose the reticle image onto a silver halide film plate 150 placed below the planar lens surface, and measure precisely the dimensions of the recorded image by observing the developed silver halide plate under a microscope. Between the planar surface of lens 172 and the dichromated gelatin film plane is a gap 152, which is precisely large enough to cause the fan of rays emanating from adjacent stripes in the focused reticle image to just touch each other at the film plane.

Diffraction fringes on the hologram should be negligible, since the aperture dimension of 0.254 mm is much larger than the laser wavelength, 514.5 nm. A spherical reference wave 154 is collimated by the plano-convex lens 142 and interferes with the diffuse object beam at the film plane 150 to create a hologram recording. Reference beam 154 corresponds generally to reference beam 146 in the process described in FIG. 11. Therefore, the angular bandwidth of the green lens may be widened by exposing multiple holograms at different interference angles, as described above. Similarly, the spectral bandwidth of the green lens may be widened by exposing multiple holograms at wavelengths that are slightly shifted with respect to the 514.5 nm center wavelength being used for the green lens. The laser wavelength may be shifted by a Bragg cell (not shown) or by any other known wavelength/frequency shifting methods. Alternatively, a tunable dye or solid state laser may be used to generate hologram writing beams.

With the green hologram exposed using the 514.5 nm line of an argon laser, the blue hologram can be exposed in a similar manner using the blue 488 nm argon laser line. While the argon laser output at 488 nm is less intense than at 514.5 nm, the dichromated gelatin film 150 is more sensitive to 488 nm light than to 514.5 nm light; the two effects basically cancel each other. Accordingly, the green and blue exposures can be done using the same argon laser by tuning the laser between exposures. For the blue exposure, a separate intermediate silver handle screen needs to be recorded. Since verification that the spacing of the striped reticle image is precisely correct is a delicate and time-consuming task, it may be preferable to have separate exposure set-ups for the green and blue exposures. In this way, once the proper alignment of the hologram image is accomplished, the set-up can remain fixed and immobile without the need to replace components. Preferably, the blue and green exposures are performed in the same dichromated gelatin layer. If the blue and green holograms are exposed on the same film plate, it is important that the blue exposure be shifted precisely 0.254 mm with respect to the green exposure.

Exposure of the red hologram should be done in a different manner. One reason is that the dichromated gelatin (DCG) film is not sensitive to red light. While a dye sensitized DCG film does achieve red sensitivity, its difficulty in usage and short shelf life discourage its employment. Silver halide holographic film which is sensitive to red light is available, but its gelatin layer may be too thin to support a highly efficient red transmission hologram. Furthermore, the argon laser does not have any appreciable red output, so another laser such as helium-neon with a 632.8 nm output would be needed.

One means of exposing the red hologram is with a red-sensitive photopolymer film produced by Polaroid Corporation under the designation DMP-128. While this film does not offer as much dynamic range as DCG, it permits fabrication of a sufficiently high-efficiency red transmission hologram. For the red hologram exposure, a separate red silver halide intermediate hologram should be fabricated, as with the blue and green hologram set-ups.

The final step is to laminate the red hologram to the blue/green hologram or, if necessary, to laminate three separate red, green and blue holograms together. In either case proper registration of the three images must be obtained. This can be accomplished with a laminating fixture in which the hologram plates are precisely positioned against alignment pins during lamination, and precise 0.254 mm shifts are created between the plates. The glue lines should be very thin and controllable to achieve proper registration.

The fabrication of the red, green and blue holograms may be summarized as follows:

1) Fabrication of striped reticle and full color playback reticle.

2) Fabrication of three intermediate silver halide holograms.

3) Assembly and precise alignment of three separate final exposure systems.

4) Exposure of red, green and blue final hologram sets.

5) Lamination of holograms with precise registration.

It is an advantage of the invention that the exposure technique can be readily adapted to large scale production. Step 4 above will generate red, green and blue hologram set masters which may then be used to generate replicas quickly by contact printing.

While several illustrative embodiments of the invention have been shown and described, numerous variations and alternate embodiments will occur to those skilled in the art. Such variations and alternate embodiments are contemplated, and can be made without departing from the spirit and scope of the appended claims.

We claim:

1. A lens structure for directing input optical radiation to a predetermined target, said radiation having a discrete wavelength that falls within a predetermined wavelength range, making a discrete angle of incidence with respect to an input side of said lens structure and having a characteristic divergence angle, with said incidence and divergence angles falling within respective predetermined ranges, comprising:

an optically transmissive substrate, and at least three holographic lens arrays that are responsive to radiation wavebands centered respectively on different colors, each of said lens arrays comprising a plurality of lateral holographic lenses, with each of said holographic lenses comprising a plurality of primary angularly customized holograms, said angularly customized holograms partially offset from each other in a staggered order and having respective acceptance angle ranges centered on respective discrete acceptance angles, said discrete acceptance angles being separated so that the acceptance angle ranges of said holograms partially overlap and the predetermined angle of incidence and divergence angle ranges of said input optical radiation fall within a cumulative acceptance angle range of said holograms.

2. The lens structure of claim 1, wherein the acceptance angle range overlap between said angularly customized holograms results in substantially all of said input radiation being diffracted towards said target over said predetermined angle of incidence, divergence angle and wavelength ranges.

3. The lens structure of claim 1, further comprising at least one reflection angularly customized hologram on said substrate for rejecting input radiation that falls outside of said predetermined angle of incidence or divergence angle range.

4. The lens structure of claim 1, each of said lens arrays further comprising a plurality of primary spectrally customized holograms, which are partially offset from each other in a staggered order and are responsive to respective radiation wavebands centered about respective discrete wavelengths, with said discrete wavelengths separated so that the radiation wavebands of said holograms partially overlap and the predetermined wavelength range of said input radiation falls within cumulative radiation wavebands of said holograms.

5. A lens structure for spatially separating white light into component radiation wavebands centered on a plurality of discrete wavelengths, said white light making a discrete angle of incidence with respect to an input side of said lens structure and having a characteristic divergence angle, with said incidence and divergence angles falling within respective predetermined ranges, comprising:

an optically transmissive substrate, and at least three holographic lens arrays that are responsive to radiation wavebands centered respectively on different colors, each of said lens arrays comprising a plurality of lateral holographic lenses, with each of said holographic lenses comprising a plurality of primary angularly customized holograms, said primary angularly customized holograms partially offset from each other in a staggered order and having respective acceptance angle ranges centered on respective discrete acceptance angles, said discrete acceptance angles being separated so that the acceptance angle ranges of said holograms partially overlap and the predetermined angle of incidence and divergence angle range of said white light fall within a cumulative acceptance angle range of said holograms.

6. The lens structure of claim 5, wherein the acceptance angle range overlap between said primary angularly customized holograms results in substantially all of said white light being separated into said component radiation wavebands over said predetermined angle of incidence and divergence angle ranges.

7. The lens structure of claim 5, wherein each of said holographic lenses further comprises at least one reflection angularly customized hologram for rejecting light that falls outside of said predetermined angle of incidence or divergence angle ranges.

8. The lens structure of claim 5, each of said lens arrays further comprising a plurality of primary spectrally customized holograms which are partially offset from each other in a stagger order and are responsive to respective radiation wavebands centered about respective discrete wavelengths, with said discrete wavelengths separated so that the radiation wavebands of said spectrally customized holograms partially overlap and define the radiation waveband of their respective lens.

9. A lens structure for spatially separating white light into component radiation wavebands centered on red, green and blue wavelengths, said white light making a discrete angle of incidence with respect to an input side of said lens structure and having a characteristic divergence angle, with said incidence and divergence angles falling within respective predetermined ranges, comprising:

first, second and third holographic lens arrays that are responsive to radiation wavebands centered respectively on red, green and blue colors, each of said lens arrays comprising a plurality of lateral holographic lenses, with each of said holographic lenses comprising a plurality of primary angularly customized holograms, and an optically transmissive substrate for holding the holographic lenses of each array so that they are offset in staggered order from the lenses of each of the other arrays by approximately one-third the lens dimension along the offset, said primary angularly customized holograms partially offset from each other in a staggered order and having respective acceptance angle ranges centered on respective discrete acceptance angles, said discrete acceptance angles being separated so that the acceptance angle ranges of said holograms partially overlap and the predetermined angle of incidence and divergence angle ranges of said white light fall within a cumulative acceptance angle range of said holograms.

10. The lens structure of claim 9, wherein the acceptance angle range overlap between said primary angularly customized holograms results in substantially all of said white light being separated into said red, green and blue radiation wavebands.

11. The lends structure of claim 9, wherein each of said holographic lenses further comprises at least one reflection angularly customized hologram for rejecting light that falls outside of said predetermined angle of incidence or divergence angle ranges.

12. The lens structure of claim 9, wherein the green lenses are responsive to a radiation bandwidth which overlaps the bandwidths of the other lenses.

13. The lens structure of claim 9, wherein the red, green and blue lenses are formed on a common substrate.

14. The lens structure of claim 9, each of said lens arrays further comprising a plurality of primary spectrally customized holograms which are partially offset from each other in a stagger order and are responsive to respective radiation wavebands centered about respective discrete wavelengths, with said discrete wavelengths separated so that the radiation wavebands of said spectrally customized holograms partially overlap and define the radiation waveband of their corresponding lens.

15. A high efficiency color display device for displaying selected elements of input optical radiation having a plurality of different waveband components, comprising:

an area target array comprising a plurality of generally adjacent target areas respectively corresponding to predetermined waveband components of the input optical radiation, and an area lens assembly spaced from said target array and adapted to receive input optical radiation having an angle of incidence and a first divergence angle that falls within respective predetermined ranges, said lens assembly having, for each target area in the target array, a focuser which is optically aligned with said target area comprising a first set of primary angularly customized holograms that are responsive to input radiation within the waveband of its corresponding target area for converging said input radiation directly onto said area target array and for generally transmitting input radiation outside of said waveband, each of said focusers and corresponding target area being adapted to direct said converging input radiation after convergence with a second divergence angle for superimposed display, the focusers for the various wavebands being arranged in said lens assembly so that at least one focuser for each of the waveband components is disposed in the path of input radiation substantially across the area of said lens assembly, each focuser partially overlapping a focuser for each of the other waveband components, said primary angularly customized holograms partially offset from each other in a staggered order and having respective acceptance angle ranges centered on respective discrete acceptance angles, said discrete acceptance angles being separated so that the acceptance angle ranges of said holograms partially overlap and the predetermined angle of incidence and first divergence angle ranges of said input optical radiation fall within a cumulative acceptance angle range of said holograms.

16. The color display device of claim 15, wherein each of said primary angularly customized holograms has a peak responsivity to said input radiation in its corresponding waveband at said discrete acceptance angle, and a generally progressively diminishing response at acceptance angles that are further away from said discrete acceptance angle.

17. The color display device of claim 15, wherein the acceptance angle range overlap between said primary angularly customized holograms results in substantially all of said input radiation being converged onto said angularly.

18. The color display device of claim 15, wherein each of said focusers further comprises at least one reflection angularly customized hologram for rejecting light that falls outside of said predetermined angle of incidence or divergence angle ranges.

19. The color display device of claim 15, wherein the radiation beam has n waveband components, the area of each target area is approximately A, and the area of each focuser is approximately nA.

20. The color display device of claim 19, wherein the waveband components are centered on red, green and blue optical radiation.

21. The color display device of claim 15, wherein said target array comprises an array of transmissive light modulation cells.

22. The lens structure of claim 15, each of said lens arrays further comprising a plurality of primary spectrally customized holograms which are partially offset from each other in a stagger order and are responsive to respective radiation wavebands centered about respective discrete wavelengths, with said discrete wavelengths separated so that the radiation wavebands of said spectrally customized holograms partially overlap and define the radiation waveband of their corresponding focuser.

23. A high efficiency color display device for displaying selected elements of input optical radiation having a plurality of different waveband components, comprising:

a target array of transmissive light modulation cells comprising a plurality of generally adjacent target areas respectively corresponding to predetermined waveband components of the input optical radiation, an area lens assembly spaced from said target array and adapted to receive input optical radiation having an angle of incidence and a first divergence angle that falls within respective predetermined ranges, said lens assembly having, for each target area in the target array, a focuser which is optically aligned with said target area comprising a first set of primary angularly customized holograms that are responsive to input radiation within the waveband of its corresponding target area for converging said input radiation directly onto said area target array and for generally transmitting input radiation outside of said waveband, each of said focusers and corresponding target area being adapted to direct said converging input radiation after convergence with a second divergence angle for superimposed display, the focusers for the various wavebands being arranged in said lens assembly so that at least one focuser for each of the waveband components is disposed in the path of input radiation substantially across the area of said lens assembly, each focuser partially overlapping a focuser for each of the other waveband components, said primary angularly customized holograms partially offset from each other in a staggered order and having respective acceptance angle ranges centered on respective discrete acceptance angles, said discrete acceptance angles being separated so that the acceptance angle ranges of said holograms partially overlap and the predetermined angle of incidence and first divergence angle ranges of said input optical radiation fall within a cumulative acceptance angle range of said holograms, and a second area lens assembly spaced from said target array on the opposite side of said target array from said first lens assembly and adapted to receive said diverging input optical radiation and superimposed the waveband components of said optical radiation after said radiation has passed through said target array, said second lens assembly having, for each cell in the target array, a focuser which is optically aligned with said cell comprising a second set of primary angularly customized holograms that are responsive to input radiation within the waveband of its corresponding cell for focusing input radiation that has passed through said cell and for generally transmitting input radiation outside of said waveband, the focusers for the various wavebands being arranged in said second lens assembly so that at least one focuser for each of the waveband components is disposed in the path of input radiation substantially across the area of said lens assembly, each focuser partially overlapping a focuser for each of the other waveband components, each of said primary angularly customized holograms in said second set having respective acceptance angle ranges centered on respective discrete acceptance angles, said discrete acceptance angles being separated so that the acceptance angle ranges of said holograms partially overlap and the predetermined angle of incidence and second divergence angle ranges of said input optical radiation fall within a cumulative acceptance angle range of said holograms.

24. The color display device of claim 23, wherein said second lens assembly is substantially identical to said first lens assembly and is spaced from said cell array at a symmetric distance with respect to said first lens assembly.

25. The color display device of claim 23, wherein said second lens assembly is designed and positioned to provide a viewing angle that is larger than an acceptance cone angle defined by said first lens assembly.

26. The color display device of claim 23, wherein said second lens assembly is designed and positioned to direct substantially all of said input optical radiation towards a predetermined target.

27. The lens structure of claim 23, each of said lens arrays further comprising a plurality of primary spectrally customized holograms which are partially offset from each other in a stagger order and are responsive to respective radiation wavebands centered about respective discrete wavelengths, with said discrete wavelengths separated so that the radiation wavebands of said spectrally customized holograms partially overlap and define the radiation waveband of their corresponding focuser, each focuser in said second area lens assembly further comprising a second set of primary spectrally customized holograms which are responsive to respective radiation wavebands centered about respective discrete wavelengths, with said discrete wavelengths separated so that the radiation wavebands of said spectrally customized holograms partially overlap and define the radiation waveband of their corresponding focuser.

28. A lens structure for directing input optical radiation to a predetermined target, said radiation having a discrete wavelength that falls within a predetermined wavelength range, making a discrete angle of incidence with respect to an input side of said lens structure and having a characteristic divergence angle, with said incidence and divergence angles falling within respective predetermined ranges, comprising:

an optically transmissive substrate, and at least three holographic lens arrays that are responsive to radiation wavebands centered respectively on different colors, each of said lens arrays comprising a plurality of lateral holographic lenses, with each of said holographic lenses comprising a plurality of primary spectrally customized holograms, said spectrally customized holograms partially offset from each other in a staggered order and being responsive to respective radiation wavebands centered about respective discrete wavelengths, with said discrete wavelengths separated so that the radiation wavebands of said holograms partially overlap and the predetermined wavelength range of said input radiation falls within cumulative radiation wavebands of said holograms.

29. The lens structure of claim 28, wherein the radiation waveband overlap between said spectrally customized holograms results in substantially all of said input radiation being diffracted towards said target over said predetermined angle of incidence, divergence angle and wavelength ranges.

30. The lens structure of claim 28, further comprising at least one reflection spectrally customized hologram on said substrate for rejecting input radiation that falls outside of said predetermined wavelength range.

31. A lens structure for spatially separating white light into component radiation wavebands centered on a plurality of discrete wavelengths, said white light making a discrete angle of incidence with respect to an input side of said lens structure and having a characteristic divergence angle, with said incidence and divergence angles falling within respective predetermined ranges, comprising:

an optically transmissive substrate, and at least three holographic lens arrays that are responsive to radiation wavebands centered respectively on different colors, each of said lens arrays comprising a plurality of lateral holographic lenses, with each of said holographic lenses comprising a plurality of primary spectrally customized holograms, said primary spectrally customized holograms partially offset from each other in a staggered order and being responsive to respective radiation wavebands centered about respective discrete wavelengths, with said discrete wavelengths separated so that the radiation wavebands of said spectrally customized holograms partially overlap and define the radiation waveband of their respective lens.

32. The lens structure of claim 31, wherein the radiation waveband overlap between said primary spectrally customized holograms results in substantially all of said white light being separated into said component radiation wavebands over said predetermined angle of incidence and divergence angle ranges.

33. The lens structure of claim 31, wherein each of said holographic lenses further comprises at least one reflection spectrally customized hologram for rejecting light that falls outside of a predetermined wavelength range.

34. A lens structure for spatially separating white light into component radiation wavebands centered on red, green and blue wavelengths, said white light making a discrete angle of incidence with respect to an input side of said lens structure and having a characteristic divergence angle, with said incidence and divergence angles falling within respective predetermined ranges, comprising:

first, second and third holographic lens arrays that are responsive to radiation wavebands centered respectively on red, green and blue colors, each of said lens arrays comprising a plurality of lateral holographic lenses, with each of said holographic lenses comprising a plurality of primary spectrally customized holograms, and an optically transmissive substrate for holding the holographic lenses of each array so that they are offset in staggered order from the lenses of each of the other arrays by approximately one-third the lens dimension along the offset, said primary spectrally customized holograms partially offset from each other in a staggered order and being responsive to respective radiation wavebands centered about respective discrete wavelengths, with said discrete wavelengths separated so that the radiation wavebands of said spectrally customized holograms partially overlap and define the radiation waveband of their corresponding lens.

35. The lens structure of claim 34 wherein the radiation waveband overlap between said primary spectrally customized holograms results in substantially all of said white light being separated into said red, green and blue radiation wavebands.

36. The lens structure of claim 34, wherein each of said holographic lenses further comprises at least one reflection spectrally customized hologram for rejecting light that falls outside of a predetermined wavelength range.

37. The lens structure of claim 34, wherein the green lenses are responsive to a radiation bandwidth which overlaps the bandwidths of the other lenses.

38. The lens structure of claim 34, wherein the red, green and blue lenses are formed on a common substrate.

39. A high efficiency color display device for displaying selected elements of input optical radiation having a plurality of different waveband components, comprising:

an area target array comprising a plurality of generally adjacent target areas respectively corresponding to predetermined waveband components of the input optical radiation, and an area lens assembly spaced from said target array and adapted to receive input optical radiation having an angle of incidence and a first divergence angle that falls within respective predetermined ranges, said lens assembly having, for each target area in the target array, a focuser which is optically aligned with said target area comprising a first set of primary spectrally customized holograms that are responsive to input radiation within the waveband of its corresponding target area for converging said input radiation directly onto said area target array and for generally transmitting input radiation outside of said waveband, each of said focusers and corresponding target area being adapted to direct said converging input radiation after convergence with a second divergence angle for superimposed display, the focusers for the various wavebands being arranged in said lens assembly so that at least one focuser for each of the waveband components is disposed in the path of input radiation substantially across the area of said lens assembly, each focuser partially overlapping a focuser for each of the other waveband components, said primary spectrally customized holograms partially offset from each other in a staggered order and being responsive to respective radiation wavebands centered about respective discrete wavelengths, with said discrete wavelengths separated so that the radiation wavebands of said spectrally customized holograms partially overlap and define the radiation waveband of their corresponding focuser.

40. The color display device of claim 39, wherein the radiation waveband overlap between said primary spectrally customized holograms results in substantially all of said input radiation being converged onto said spectrally customized holograms' corresponding target area.

41. The color display device of claim 39, wherein each of said focusers further comprises at least one reflection spectrally customized hologram for rejecting light that falls outside of a predetermined wavelength range.

42. The color display device of claim 39, wherein the radiation beam has n waveband components, the area of each target area is approximately A, and the area of each focuser is approximately nA.

43. The color display device of claim 42, wherein the waveband components are centered on red, green and blue optical radiation.

44. The color display device of claim 39, wherein said target array comprises an array of transmissive light modulation cells.

45. A high efficiency color display device for displaying selected elements of input optical radiation having a plurality of different waveband components, comprising:

a target array of transmissive light modulation cells comprising a plurality of generally adjacent target areas respectively corresponding to predetermined waveband components of the input optical radiation, an area lens assembly spaced from said target array and adapted to receive input optical radiation having an angle of incidence and a first divergence angle that falls within respective predetermined ranges, said lens assembly having, for each target area in the target array, a focuser which is optically aligned with said target area comprising a first set of primary spectrally customized holograms that are responsive to input radiation within the waveband of its corresponding target area for converging said input radiation directly onto said area target array and for generally transmitting input radiation outside of said waveband, each of said focusers and corresponding target area being adapted to direct said converging input radiation after convergence with a second divergence angle for superimposed display, the focusers for the various wavebands being arranged in said lens assembly so that at least one focuser for each of the waveband components is disposed in the path of input radiation substantially across the area of said lens assembly, each focuser partially overlapping a focuser for each of the other waveband components, said primary spectrally customized holograms partially offset from each other in a staggered order and being responsive to respective radiation wavebands centered about respective discrete wavelengths, with said discrete wavelengths separated so that the radiation wavebands of said spectrally customized holograms partially overlap and define the radiation waveband of their corresponding focuser, and a second area lens assembly spaced from said target array on the opposite side of said target array from said first lens assembly and adapted to receive said diverging input optical radiation and superimpose the waveband components of said optical radiation after said radiation has passed through said target array, said second lens assembly having, for each cell in the target array, a focuser which is optically aligned with said cell comprising a second set of primary spectrally customized holograms that are responsive to input radiation within the waveband of its corresponding cell for focusing input radiation that has passed through said cell and for generally transmitting input radiation outside of said waveband, the focusers for the various wavebands being arranged in said second lens assembly so that at least one focuser for each of the waveband components is disposed in the path of input radiation substantially across the area of said lens assembly, each focuser partially overlapping a focuser for each of the other waveband components, each of said primary spectrally customized holograms being responsive to respective radiation wavebands centered about respective discrete wavelengths, with said discrete wavelengths separated so that the radiation wavebands of said spectrally customized holograms partially overlap and define the radiation waveband of their corresponding focuser.

46. The color display device of claim 45, wherein said second lens assembly is substantially identical to said first lens assembly and is spaced from said cell array at a symmetric distance with respect to said first lens assembly.

47. The color display of claim 45, wherein said second lens assembly is designed and positioned to provide a viewing angle that is larger than an acceptance cone angle defined by said first lens assembly.

48. The color display device of claim 45, wherein said second lens assembly is designed and positioned to direct substantially all of said input optical radiation towards a predetermined target.

* * * * *